(12) United States Patent
Slaney et al.

(10) Patent No.: US 8,910,199 B2
(45) Date of Patent: Dec. 9, 2014

(54) TARGETED TELEVISION CONTENT DISPLAY

(75) Inventors: Malcolm Slaney, Los Altos Hills, CA (US); Bonnie M. Johnson, Palo Alto, CA (US); Annarosa Tomasi, Menlo Park, CA (US)

(73) Assignee: Interval Licensing LLC, Seattle, WA (US)

( * ) Notice: Subject to any disclaimer, the term of this patent is extended or adjusted under 35 U.S.C. 154(b) by 243 days.

(21) Appl. No.: 12/400,667

(22) Filed: Mar. 9, 2009

(65) Prior Publication Data

US 2009/0210902 A1 Aug. 20, 2009

Related U.S. Application Data

(63) Continuation of application No. 09/724,786, filed on Nov. 28, 2000, now abandoned, and a continuation of application No. 09/724,939, filed on Nov. 28, 2000, now abandoned, and a continuation-in-part of application No. 09/541,056, filed on Feb. 25, 2000, now Pat. No. 6,574,793.

(60) Provisional application No. 60/198,037, filed on Apr. 18, 2000, provisional application No. 60/198,038, filed on Apr. 18, 2000, provisional application No. 60/198,036, filed on Apr. 18, 2000, provisional application No. 60/198,034, filed on Apr. 18, 2000, provisional application No. 60/185,182, filed on Feb. 25, 2000.

(51) Int. Cl.

| H04N 7/10 | (2006.01) |
|---|---|
| H04H 60/45 | (2008.01) |
| H04N 21/454 | (2011.01) |
| H04N 21/442 | (2011.01) |
| H04N 21/4223 | (2011.01) |
| H04N 21/422 | (2011.01) |
| H04N 21/4415 | (2011.01) |
| H04N 21/81 | (2011.01) |
| H04N 7/16 | (2011.01) |

(52) U.S. Cl.
CPC ............. *H04N 7/163* (2013.01); *H04H 60/45* (2013.01); *H04N 21/4542* (2013.01); *H04N 21/44222* (2013.01); *H04N 21/4223* (2013.01); *H04N 21/42201* (2013.01); *H04N 21/4415* (2013.01); *H01N 21/4751* (2013.01); *H04N 21/812* (2013.01); *H04N 21/42203* (2013.01); *G04N 21/4532* (2013.01)
USPC .................. 725/34; 725/22; 725/36; 725/39; 725/42; 725/47; 705/14.4; 705/14.5

(58) Field of Classification Search
USPC .................................. 725/34, 10, 14; 707/10
See application file for complete search history.

(56) References Cited

U.S. PATENT DOCUMENTS

| 3,868,675 A | 2/1975 | Firmin |
|---|---|---|
| 4,258,386 A | 3/1981 | Cheung et al. |

(Continued)

FOREIGN PATENT DOCUMENTS

| JP | 2054331 | 2/1990 |
|---|---|---|
| JP | 4051628 | 2/1992 |

(Continued)

OTHER PUBLICATIONS

Non-Final Office Action for U.S. Appl. No. 11/250,083, Mail Date Jun. 23, 2009, 16 pages.

(Continued)

*Primary Examiner* — Brian T Pendleton
*Assistant Examiner* — Alan Luong
(74) *Attorney, Agent, or Firm* — Perkins Coie LLP

(57) ABSTRACT

The invention enables and/or facilitates the display of personalized content to content observers by content providers (e.g., advertisers) who disseminate content over a network. In particular, the invention can be used to enable the display of targeted content to television viewers and/or targeted product placements within a television program. The invention can advantageously enable identification of the content observer(s) observing a content display device at a particular time and/or identification of the content display site, and selection of targeted content for display based on a determination of content appropriate for display to those content observer(s) in accordance with a criterion based on the identity and/or a characteristic of the content observer(s) and/or the content display site.

24 Claims, 8 Drawing Sheets

(56) References Cited

U.S. PATENT DOCUMENTS

| | | |
|---|---|---|
| 4,319,286 A | 3/1982 | Hanpachern |
| 4,390,904 A | 6/1983 | Johnston et al. |
| 4,546,382 A | 10/1985 | McKenna et al. |
| 4,602,279 A | 7/1986 | Freeman |
| 4,750,053 A | 6/1988 | Allen |
| 4,782,401 A | 11/1988 | Faerber et al. |
| 4,841,291 A | 6/1989 | Swix et al. |
| 4,845,658 A | 7/1989 | Gifford |
| 4,858,000 A * | 8/1989 | Lu ................................ 725/12 |
| 4,907,079 A | 3/1990 | Turner et al. |
| 4,931,865 A * | 6/1990 | Scarampi ...................... 725/12 |
| 5,105,184 A | 4/1992 | Pirani et al. |
| 5,164,992 A | 11/1992 | Turk et al. |
| 5,223,924 A | 6/1993 | Strubbe |
| 5,231,494 A | 7/1993 | Wachob |
| 5,295,064 A | 3/1994 | Malec et al. |
| 5,305,195 A | 4/1994 | Murphy |
| 5,347,632 A | 9/1994 | Filepp et al. |
| 5,410,344 A | 4/1995 | Graves et al. |
| 5,422,986 A | 6/1995 | Neely |
| 5,436,637 A | 7/1995 | Gayraud et al. |
| 5,440,337 A | 8/1995 | Henderson et al. |
| 5,446,919 A * | 8/1995 | Wilkins ........................ 725/35 |
| 5,481,294 A | 1/1996 | Thomas et al. |
| 5,497,185 A | 3/1996 | Dufresne et al. |
| 5,498,002 A | 3/1996 | Gechter |
| 5,504,518 A | 4/1996 | Ellis et al. |
| 5,515,098 A | 5/1996 | Carles |
| 5,532,735 A | 7/1996 | Blahut et al. |
| 5,546,071 A | 8/1996 | Zdunich |
| 5,550,735 A | 8/1996 | Slade et al. |
| 5,550,928 A | 8/1996 | Lu et al. |
| 5,550,965 A | 8/1996 | Gabbe et al. |
| 5,559,549 A | 9/1996 | Hendricks et al. |
| 5,572,643 A | 11/1996 | Judson |
| 5,579,055 A | 11/1996 | Hamilton et al. |
| 5,583,560 A | 12/1996 | Florin et al. |
| 5,589,892 A | 12/1996 | Knee et al. |
| 5,596,373 A | 1/1997 | White et al. |
| 5,600,364 A | 2/1997 | Hendricks et al. |
| 5,600,573 A | 2/1997 | Hendricks et al. |
| 5,608,445 A | 3/1997 | Mischler et al. |
| 5,619,709 A | 4/1997 | Caid et al. |
| 5,659,350 A | 8/1997 | Hendricks et al. |
| 5,661,516 A | 8/1997 | Carles |
| 5,682,195 A | 10/1997 | Hendricks et al. |
| 5,704,017 A | 12/1997 | Heckerman |
| 5,708,478 A | 1/1998 | Tognazzini |
| 5,717,814 A | 2/1998 | Abecassis |
| 5,717,923 A | 2/1998 | Dedrick |
| 5,724,091 A | 3/1998 | Freeman et al. |
| 5,724,424 A | 3/1998 | Gifford |
| 5,724,472 A | 3/1998 | Abecassis |
| 5,724,521 A | 3/1998 | Dedrick |
| 5,729,279 A | 3/1998 | Fuller |
| 5,734,853 A | 3/1998 | Hendricks et al. |
| 5,740,549 A | 4/1998 | Reilly et al. |
| 5,754,939 A | 5/1998 | Herz et al. |
| 5,758,258 A | 5/1998 | Shoff et al. |
| 5,761,606 A | 6/1998 | Wolzien |
| 5,767,857 A | 6/1998 | Neely |
| 5,767,894 A | 6/1998 | Fuller et al. |
| 5,768,528 A | 6/1998 | Stumm |
| 5,771,307 A | 6/1998 | Lu et al. |
| 5,774,170 A | 6/1998 | Hite et al. |
| 5,786,845 A | 7/1998 | Tsuria et al. |
| 5,793,409 A | 8/1998 | Tetsumura et al. |
| 5,794,210 A | 8/1998 | Goldhaber et al. |
| 5,798,785 A | 8/1998 | Hendricks et al. |
| 5,801,747 A | 9/1998 | Bedard |
| 5,805,974 A | 9/1998 | Hite et al. |
| 5,812,647 A | 9/1998 | Beaumont et al. |
| 5,812,732 A | 9/1998 | Dettmer et al. |
| 5,818,512 A | 10/1998 | Fuller |
| 5,819,284 A | 10/1998 | Farber et al. |
| 5,826,165 A | 10/1998 | Echeita et al. |
| 5,828,839 A | 10/1998 | Moncreiff |
| 5,835,667 A | 11/1998 | Wactlar et al. |
| 5,862,324 A | 1/1999 | Collins |
| 5,872,588 A | 2/1999 | Aras et al. |
| 5,872,850 A | 2/1999 | Klein et al. |
| 5,873,068 A | 2/1999 | Beaumont et al. |
| 5,874,986 A | 2/1999 | Gibbon et al. |
| 5,877,755 A | 3/1999 | Hellhake |
| 5,892,535 A | 4/1999 | Allen et al. |
| 5,892,554 A | 4/1999 | DiCicco et al. |
| 5,892,691 A | 4/1999 | Fowler |
| 5,900,919 A | 5/1999 | Chen et al. |
| 5,903,816 A | 5/1999 | Broadwin et al. |
| 5,907,322 A | 5/1999 | Kelly et al. |
| 5,913,040 A | 6/1999 | Rakavy et al. |
| 5,915,243 A | 6/1999 | Smolen |
| 5,917,553 A | 6/1999 | Honey et al. |
| 5,918,014 A | 6/1999 | Robinson |
| 5,926,207 A | 7/1999 | Vaughan et al. |
| 5,929,849 A | 7/1999 | Kikinis |
| 5,933,150 A | 8/1999 | Ngo et al. |
| 5,933,811 A | 8/1999 | Angles et al. |
| 5,945,988 A | 8/1999 | Williams et al. |
| 5,946,646 A | 8/1999 | Schena et al. |
| 5,948,061 A | 9/1999 | Merriman et al. |
| 5,953,076 A | 9/1999 | Astle et al. |
| 5,959,623 A | 9/1999 | van Hoff et al. |
| 5,966,120 A | 10/1999 | Arazi et al. |
| 5,974,398 A | 10/1999 | Hanson et al. |
| 5,977,964 A | 11/1999 | Williams et al. |
| 5,990,927 A | 11/1999 | Hendricks et al. |
| 6,002,393 A | 12/1999 | Hite et al. |
| 6,002,833 A | 12/1999 | Abecassis |
| 6,005,564 A | 12/1999 | Ahmad et al. |
| 6,006,197 A | 12/1999 | d'Eon et al. |
| 6,006,257 A | 12/1999 | Slezak |
| 6,008,802 A | 12/1999 | Iki et al. |
| 6,011,895 A | 1/2000 | Abecassis |
| 6,012,051 A | 1/2000 | Sammon, Jr. et al. |
| 6,020,883 A | 2/2000 | Herz et al. |
| 6,020,931 A | 2/2000 | Bilbrey et al. |
| 6,026,369 A | 2/2000 | Capek |
| 6,029,045 A | 2/2000 | Picco et al. |
| 6,034,652 A | 3/2000 | Freiberger et al. |
| 6,036,601 A | 3/2000 | Heckel |
| 6,038,367 A | 3/2000 | Abecassis |
| 6,044,376 A | 3/2000 | Kurtzman, II |
| 6,052,492 A | 4/2000 | Bruckhaus |
| 6,052,554 A | 4/2000 | Hendricks et al. |
| 6,075,551 A | 6/2000 | Berezowski et al. |
| 6,100,941 A | 8/2000 | Dimitrova et al. |
| 6,104,425 A | 8/2000 | Kanno et al. |
| 6,112,192 A | 8/2000 | Capek |
| 6,141,010 A | 10/2000 | Hoyle |
| 6,141,463 A | 10/2000 | Covell et al. |
| 6,160,570 A | 12/2000 | Sitnik |
| 6,169,542 B1 | 1/2001 | Hooks et al. |
| 6,177,931 B1 | 1/2001 | Alexander et al. |
| 6,208,386 B1 | 3/2001 | Wilf et al. |
| 6,237,022 B1 * | 5/2001 | Bruck et al. .................. 709/201 |
| 6,240,555 B1 | 5/2001 | Shoff et al. |
| 6,243,104 B1 * | 6/2001 | Murray ........................ 345/629 |
| 6,282,713 B1 | 8/2001 | Kitsukawa et al. |
| 6,286,005 B1 | 9/2001 | Cannon |
| 6,314,569 B1 | 11/2001 | Chernock et al. |
| 6,324,519 B1 | 11/2001 | Eldering |
| 6,351,265 B1 | 2/2002 | Bulman |
| 6,357,043 B1 | 3/2002 | Ellis et al. |
| 6,438,751 B1 | 8/2002 | Voyticky et al. |
| 6,457,010 B1 * | 9/2002 | Eldering et al. ................ 725/14 |
| 6,484,148 B1 | 11/2002 | Boyd |
| 6,519,769 B1 | 2/2003 | Hopple et al. |
| 6,560,281 B1 | 5/2003 | Black et al. |
| 6,570,499 B2 | 5/2003 | Kaganer |
| 6,574,793 B1 | 6/2003 | Ngo et al. |
| 6,597,405 B1 | 7/2003 | Iggulden |
| 6,615,408 B1 | 9/2003 | Kaiser et al. |
| 6,681,393 B1 * | 1/2004 | Bauminger et al. ............ 725/23 |

(56) References Cited

U.S. PATENT DOCUMENTS

| | | |
|---|---|---|
| 6,684,194 B1 | 1/2004 | Eldering et al. |
| 6,698,020 B1 * | 2/2004 | Zigmond et al. ............... 725/34 |
| 6,708,335 B1 * | 3/2004 | Ozer et al. ...................... 725/20 |
| 6,735,776 B1 | 5/2004 | Legate |
| 6,750,880 B2 | 6/2004 | Freiberger et al. |
| 6,788,314 B1 | 9/2004 | Freiberger et al. |
| 6,906,732 B1 | 6/2005 | Li et al. |
| 6,968,565 B1 | 11/2005 | Slaney et al. |
| 6,993,245 B1 | 1/2006 | Harville |
| 7,134,130 B1 | 11/2006 | Thomas |
| 7,134,132 B1 | 11/2006 | Ngo et al. |
| 7,348,935 B1 | 3/2008 | Freiberger et al. |
| 7,409,437 B2 | 8/2008 | Ullman et al. |
| 7,661,116 B2 | 2/2010 | Slaney et al. |
| 7,720,432 B1 | 5/2010 | Colby et al. |
| 2002/0046084 A1 | 4/2002 | Steele et al. |
| 2002/0062481 A1 | 5/2002 | Slaney et al. |
| 2002/0131760 A1 | 9/2002 | Hirai et al. |
| 2003/0055831 A1 * | 3/2003 | Ryan et al. ..................... 707/100 |
| 2003/0110499 A1 * | 6/2003 | Knudson et al. ............... 725/42 |
| 2003/0145323 A1 * | 7/2003 | Hendricks et al. ............. 725/34 |
| 2003/0200128 A1 | 10/2003 | Doherty |
| 2004/0194131 A1 | 9/2004 | Ellis et al. |
| 2006/0029368 A1 | 2/2006 | Harville |
| 2007/0067800 A1 * | 3/2007 | Wachtfogel et al. ............ 725/42 |
| 2010/0242063 A1 | 9/2010 | Slaney et al. |
| 2010/0281499 A1 | 11/2010 | Harville |

FOREIGN PATENT DOCUMENTS

| | | |
|---|---|---|
| JP | 05037870 A | 2/1993 |
| WO | WO-94/13107 | 6/1994 |
| WO | WO-95/15649 | 6/1995 |
| WO | WO-95/15658 | 6/1995 |
| WO | WO-96/24115 | 8/1996 |
| WO | WO-97/00494 | 1/1997 |
| WO | WO-97/00581 | 1/1997 |
| WO | WO-97/00582 | 1/1997 |
| WO | WO-97/41683 | 11/1997 |
| WO | WO-98/24242 | 6/1998 |
| WO | WO-98/24243 | 6/1998 |
| WO | WO-98/28906 | 7/1998 |
| WO | WO 9828906 A2 * | 7/1998 |
| WO | WO-9904561 A1 | 1/1999 |
| WO | WO-99/38320 | 7/1999 |
| WO | WO-99/45702 | 9/1999 |
| WO | WO-99/52285 | 10/1999 |
| WO | WO-99/55066 | 10/1999 |
| WO | WO-99/60789 | 11/1999 |
| WO | WO-00/22818 | 4/2000 |
| WO | WO-00/33160 | 6/2000 |
| WO | WO-00/33163 | 6/2000 |
| WO | WO-00/33228 | 6/2000 |
| WO | WO-00/33233 | 6/2000 |

OTHER PUBLICATIONS

Letter of Interrogation for Japanese Application No. 1997-533741, Mail Date Jun. 16, 2009, 7 pages.

Tokuda, "To Make the Internet Free—Mr. Y. Itakura (president of Hyper-net company)", Nikkei Business Publications, Inc., Mar. 11, 1996, Japan, No. 831, p. 136-140.

Fujikawa, "Subrogation of User Account by Advertisement", Nikkei Communications, Nikkei BP Company, Mar. 4, 1996, Japan, No. 217, p. 54.

Non-Final Office Action for U.S. Appl. No. 09/789,926, Mail Date Aug. 12, 2009, 19 pages.

Notice of Allowance for U.S. Appl. No. 11/869,369, Mail Date Sep. 29, 2009, 23 pages.

Non-Final Office Action for U.S. Appl. No. 11/250,083, Mail Date Jan. 8, 2010, 11 pages.

"About GAIN Ad Vehicles," http://www.gainpublishing.com/about, pp. 1-2 [Internet accessed Apr. 26, 2004].

"Double Click Press Kit," www.doubleclick.com, 2 pages.

"GAIN—Support Center," http://www.gainpublishing.com/help/gainfaq.html, pp. 1-5 [Internet accessed Apr. 26, 2004].

"GAIN Publishing-Software," http://www.gainpublishing.com/software, pp. 1-3 [Internet accessed Apr. 26, 2004].

"General Instrument & ACTV to Offer a Complete Solution for Addressable, Targeted Digital Television Advertising," ACTV and The Box Music Network, Press Release, www.actv.com/newpage/press/actvgiad.html, Jun. 14, 1999, 3 pages.

"Scientific-Atlanta's Explorer 2000 Advanced Digital Set-Top Will Support ACTV's 'Inidvidualized Television'," ACTV and Scientific-Atlanta, Pres;s Release, www.actv.com/newpage/press/actvsatl.html, Jan. 25, 1999, 3 pages.

"What is Wink: How wink works," www.wink.com, 3 pages.

Adauction.com, http://web.archive.org/web/20000302051902/http://www.adauction.com, pp. 1-2, internet archive date of Mar. 2, 2000 [accessed Apr. 6, 2007].

Bregler et al., "Video Rewrite: Driving Visual Speech with Audio, Interval Research Corporation," Abstract and ACM SIGGRAPH 97 Paper, 10 pages.

Bove, M. et al., "Adding Hyperlinks to Digital Television," MIT Media Laboratory, Proc. 140th SMPTE Technical Conference, 1998, 11 pages.

Claria, Products and Services Overview, http://www.clairia.com/products/index.html, pp. 1-3 [Internet accessed Apr. 26, 2004].

Darrell et al., "A Virtual Mirror Interface using Real-time Robust Face Tracking," Proceedings of the Third International Conference on Face and Gesture Recognition, Apr. 1998, IEEE Computer Society Press, Nara, Japan, 20 pages.

Delio, M., "TV Commercials Get Personal," Wired News, Sep. 20, 2000, www.wired.com/news/print/0.1294.38754.00.html, 3 pages.

Ebert, R., "The Incredible Shrinking Media Lab," Y-Life: Roger Ebert-Critical Eye, Mar. 1999, http://www.zdnet.com, 3 pgs. [Internet accessed on Nov. 23, 1999].

Koenen, R., "Overview of the MPEG-4 Standard, International Organisation for Standardisation Organisation Internatioanale De Normalisation ISO/IEC JTC1/SC29/WG11 Coding of Moving Pictures and Audio," ISO/IEC JTC1/SC29/WG11 N4030, Mar. 2001, http://www.cselt.it/mpeg/standars/mpeg-4/mpeg-4.htm, pp. 1-78.

Lyon, R.F., "The Optical Mouse, and an Architectural Methodology for Smart Digital Sensors," Xerox PARC, VLSI-81-1, Aug. 1981, 38 pages.

"MIT Media Lab's Hypersoap uses hyperlinks to mix shopping, entertainment," MIT News, Nov. 9, 1998, 3 pgs. [Internet accessed on Nov. 23, 1999].

Moghaddam et al., "Research Index: Probabilistic Visual learning for Object Detection," http://citeseer.nj.nec.com/moghaddam95probabilistic.html, 1995, 3 pages.

Moghaddam, B. et al., "Abstract: Probabilistic Visual learning for Object Detection," IEEE Transactions on Pattern Analysis and Machine Intelligence, vol. 19, No. 7, Jul. 1997, www.computer.org/tpami/tp1997/i0696abs.htm, 1 page.

Sutton et al., "Reinforcement Learning: An Introduction," http://www-anw.cs.umass.edu/~rich/book/the-book.html, MIT Press, Cambridge, MA, 1998, 4 pages.

Gomes, "Upstart's Internet 'TV' Has Microsoft Tuned In," Wall Street Journal, Aug. 1996, 1 page.

Rigdon, "Screen Savers Go Beyond Fish, Flying Toasters," Wall Street Journal, Feb. 13, 1996, 1 page.

Staff Reporter, "PointCast Inc. is Testing New Screen-Saver Product," Wall Street Journal, May 1996, 1 page.

AsSeenIn.com, http://www.asseenin.com/asseenin/infor, 3 pgs. [Internet accessed on Jan. 12, 2000].

U.S. Appl. No. 13/475,822, filed May 18, 2012, Slaney et al.

U.S. Appl. No. 13/619,661, filed Sep. 14, 2012, Slaney et al.

U.S. Appl. No. 13/619,789, filed Sep. 14, 2012, Harville.

\* cited by examiner

TARGETED TELEVISION CONTENT DISPLAY

CROSS-REFERENCE TO RELATED APPLICATION(S)

This application is a continuation of U.S. patent application Ser. No. 09/724,786, entitled "Targeted Television Content Display," filed on Nov. 28, 2000 now abandoned, and a continuation of U.S. patent application Ser. No. 09/724,939, entitled "Display of Targeted Content Within a Television Program," filed on Nov. 28, 2000 now abandoned. U.S. patent applications Ser. Nos. 09/724,786 and 09/724,939 are continuations-in-part of U.S. provisional patent application Ser. Nos. 60/198,039, 60/198,037, 60/198,038, 60/198,036 and 60/198,034, filed on Apr. 18, 2000, U.S. provisional patent application Ser. No. 60/185,182, filed on Feb. 25, 2000, and U.S. patent application Ser. No. 09/514,056, filed on Feb. 25, 2000, now U.S. Pat. No. 6,574,793 the disclosures of which are hereby incorporated by reference.

U.S. patent application Ser. No. 09/724,786 is also related to the following commonly-owned, co-pending United States patent applications filed on the same date as U.S. patent application Ser. No. 09/724,786, the disclosure of each of which is incorporated by reference: 1) "Auction for Targeted Content," by Malcolm Slaney et al.; 2) "Display of Targeted Content Within a Television Program," by Malcolm Slaney et al.; 3) "Characterizing a Content Display Observer," by Malcolm Slaney et al.; and 4) "Detection of Content Display Observers With Prevention of Unauthorized Access to Identification Signal," by Malcolm Slaney et al.

U.S. patent application Ser. No. 09/724,939 is also related to the following commonly-owned, co-pending United States patent applications filed on the same date as U.S. patent application Ser. No. 09/724,939, the disclosure of each of which is incorporated by reference: 1) "Targeted Television Content Display," by Malcolm Slaney et al.; 2) "Auction for Targeted Content," by Malcolm Slaney et al.; 3) "Characterizing a Content Display Observer," by Malcolm Slaney et al.; and 4) "Detection of Content Display Observers With Prevention of Unauthorized Access to Identification Signal," by Malcolm Slaney et al.

BACKGROUND

1. Field of the Invention

This invention relates generally to displaying targeted content to content observers and, in particular, to displaying targeted content to television viewers. Most particularly, the invention relates to displaying targeted content (e.g., targeted product placements) within a television program and to displaying such targeted content based on the identity and/or a characteristic of a television viewer who is determined to be viewing a television at the time that the targeted content is to be displayed on the television.

2. Related Art

The direct marketing industry has demonstrated the value in being able to target content (in the case of direct marketing, typically an advertisement) to a particular type of consumer. A targeted advertisement increases the likelihood of stimulating a consumer's interest in a product or service. For example, the message that would be used effectively to sell a car to a family with children that places a high value on safety is clearly very different from the message that would be used effectively to sell the same car to a recent college graduate who is looking forward to the chance to spread their wings.

Further, particular advertisers may desire to communicate only with particular consumers. For example, a manufacturer of feminine hygiene products may highly value the ability to show their commercial to a female, but will place little or no value on the ability to show the commercial to an elderly male viewer. Similarly, a skateboard manufacturer would love to show their advertisement to teens, but has little interest in showing the advertisement to viewers of other ages.

Like other content providers, content providers that deliver content for display on television (e.g., broadcast stations, cable operators) have an interest in delivering and displaying targeted content to television viewers. Television content providers desire to exploit the value of their product. Their primary vehicle for doing so is selling advertising time. Delivering custom advertisements targeted to particular viewers can increase the value of that advertising time. In many ways delivering custom television broadcast content is similar to the airline industry's efforts at yield management. Content providers (e.g., advertisers) have a period of time (e.g., 30 second commercial break in a television program) to present their message and if they don't extract the maximum value from this time then it is lost forever. Currently, television advertisers seek to target their advertising by picking appropriate television programs during which to show their advertisements. However, it is desirable to enable a more precise form of targeted marketing for television advertising and, more generally, to enable custom content delivery for use in provision of television content (e.g., television broadcasts, on-demand television content delivery).

A television content delivery system provided by ACTV, Inc. of New York, N.Y. broadcasts several commercials together for possible display by receiving televisions, with only one of the commercials being displayed on each television. (See, e.g., U.S. Pat. No. 5,724,091.) Since all of the possible commercials are broadcast in real-time for immediate use in generating a display, only a small number of commercials can be sent. Therefore, the number of possible different commercial messages is small.

Additionally, the particular commercial chosen for display on a television at a particular time is not dependent on a determination of the characteristics of the viewer(s) that are watching the television at that particular time. Therefore, the particular commercial displayed on a television at a particular time may not be appropriate for the viewer(s) watching the television at that time.

Access to advertising space can be distributed by auction. (See, for example, the advertisement auction services provided by adauction.com, as described, for example, at www.adauction.com.) Distributing access to advertising space by auction can enable those advertisers who most highly value particular access to advertising space to obtain that access. However, advertisement auctions have not enabled advertising space to be auctioned in real time as the advertising space becomes available for display of an advertisement. Nor have advertisement auctions enabled an advertising space to be auctioned off piecemeal to different advertisers who will present different advertisements within that space, i.e., advertisements auctions have not been used to enable targeted advertising. For example, advertisement auctions have not been used to enable different television advertisements to be presented to different television viewers.

The use of a personal video recorder (PVR), a type of digital consumer VCR having capabilities for flexibly viewing television broadcasts that is available from such companies as TiVo, Inc. of Sunnyvale, Calif. or ReplayTV, Inc. of Mountain View, Calif., can enable a television viewer to fast-forward through commercial breaks in a television program.

As the use of PVRs becomes more prevalent, and the likelihood that a substantial number of viewers are bypassing viewing of advertisements during commercial breaks increases, many commercial messages may migrate to product placements inside a television program. Instead of a distinct time during a television program at which there is a break for a commercial message, products will be seamlessly incorporated into the television program. For example, a cereal maker may advertise their product by having Jerry Seinfeld pick up a box of their cereal during an episode of "Seinfeld."

It can be desirable to enable such advertising to be targeted to particular viewers. Princeton Video Image, Inc. of Lawrenceville, N.J. has developed techniques to enable virtual billboards or signs in a television program to be changed to include content from multiple different content providers. Thus, for example, the content of a virtual sign on a wall behind home plate in a baseball stadium can be revised as desired to present content from a particular advertiser (e.g., company logos of different advertisers can be displayed at different times on the virtual sign). However, the integration of such virtual billboards or signs with surrounding content so that each version of the virtual billboard or sign is seamlessly integrated with the surrounding content is typically much easier to do than is the seamless integration of other types of changeable content (e.g., an object handled, or otherwise interacted with, by a character in a television program) with the surrounding content, since the virtual billboard or sign is typically not as integrated into that surrounding content. For example, the virtual sign on a wall behind home plate in a baseball stadium is typically surrounded only by a monochromatic wall; more complex content is (relatively) distant from the virtual sign.

SUMMARY

The invention enables and/or facilitates the display of personalized content to content observers by content providers (e.g., advertisers) who disseminate content over a network. In particular, the invention can be used to enable the display of targeted content to television viewers. The invention can be implemented for use with a television network by having a set top box (or similar television control device) with processing capability connected to each of multiple televisions on the network. A large variety of targeted content can be stored on data storage devices at each location of a content display device (e.g., data storage devices associated with television set top boxes). The invention enables identification of the viewer(s) viewing the content display device at a particular time and/or identification of the television viewing location, and selects targeted content for display based on a determination of content appropriate for display to those viewer(s) and/or that television viewing location in accordance with a criterion based on the identity and/or a characteristic of the viewer(s) and/or television viewing location. The invention can track the viewing habits of each viewer. Decisions regarding which of a variety of targeted content to display to each viewer can be based on the viewer's viewing habits. The invention can be implemented to make real-time determinations regarding which of multiple versions of content to display to particular content observer(s) and/or television viewer(s). Since an identification of the viewer(s) viewing the content display device at a particular time can be made, the invention enables more accurate targeting of content than previous systems for delivering and displaying targeted content to observers. Additionally, the local storage and decision-making overcomes limitations of previous systems for delivering and displaying targeted content to observers. The invention can be used to display targeted content (e.g., targeted product placements) within a television program. The invention can also be used to sell (e.g., auction) the attention of each television viewer (i.e., sell the right to display content to that television viewer) to the content provider that places the highest value on that television viewer's attention. Further, the invention can be implemented to enable each right to display content to a television viewer to be auctioned in real-time as that opportunity for display content becomes available.

In one embodiment of the invention, targeted television content is displayed by i) receiving a plurality of sets of targeted content at the television viewing location, each of the plurality of sets of targeted content adapted for display on the television during a targeted content display opportunity; ii) ascertaining the identity and/or a characteristic of a television viewer watching the television at, or just prior to, the time of the targeted content display opportunity; and iii) processing instructions and/or data for selecting one of the received plurality of sets of targeted content for display to the television viewer during the targeted content display opportunity in accordance with a criterion based on the identity and/or the characteristic of the television viewer.

In one embodiment of the invention, a set of targeted content is displayed within a display of a set of primary content on a television by i) ascertaining the identity and/or a characteristic of a television viewer watching the television at, or just prior to, the time of a targeted content display opportunity; ii) processing instructions and/or data for selecting one of a plurality of sets of targeted content for display to the television viewer during the targeted content display opportunity in accordance with a criterion based on the identity and/or the characteristic of the television viewer; iii) receiving a set of primary content at the television viewing location; iv) receiving a set of targeted content at the television viewing location; and v) integrating the selected set of targeted content into the set of primary content.

In another embodiment of the invention, a set of targeted content is displayed within a display of a set of primary content on a television by i) ascertaining the identity and/or a characteristic of the television viewing location; ii) processing instructions and/or data for selecting one of a plurality of sets of targeted content for display to a television viewer during a targeted content display opportunity at the television viewing location in accordance with a criterion based on the identity and/or the characteristic of the television viewing location; iii) receiving a set of primary content at the television viewing location; iv) receiving a set of targeted content at the television viewing location; and v) integrating the selected set of targeted content into the set of primary content.

The invention can be implemented so that a filter at the television viewing location eliminates some of the sets of targeted content transmitted to the television viewing location prior to storage on a data storage device at the television viewing location, thus reducing the data storage requirements at the television viewing location. The invention can also enable monitoring (auditing) of the display of sets of targeted content by the television (e.g., counting the number of times that a set of targeted content has been displayed). The auditing can be done at the television viewing location.

The instructions and/or data for selecting one of the plurality of sets of targeted content for display can include instructions and/or data that specify the identity and/or a characteristic of a television viewer to whom it is desired to display a set of targeted content. Similarly, the instructions and/or data for selecting one of the plurality of sets of targeted content for display can include instructions and/or data that specify the identity and/or a characteristic of a television viewing location at which it is desired to display a set of targeted content.

The instructions and/or data for selecting one of the plurality of sets of targeted content for display can include instructions and/or data regarding when a set of targeted content can or cannot be displayed. Such instructions and/or data can include, for example, instructions and/or data regarding the number of times that a set of targeted content can or cannot be displayed at a particular television viewing location and/or to a particular television viewer. Such instructions and/or data can include, for example, instructions and/or data regarding the frequency with which a set of targeted content can or cannot be displayed at a particular television viewing location and/or to a particular television viewer. Such instructions and/or data can include, for example, instructions and/or data regarding an absolute time or times at which the set of targeted content can or cannot be displayed. Such instructions and/or data can include, for example, include instructions and/or data regarding a range of times during which the set of targeted content can or cannot be displayed. Such instructions and/or data can include, for example, instructions and/or data regarding the temporal proximity of display of the set of targeted content to the display of other content (e.g., to another display of the same set of targeted content, to the display of content of a particular type, to the display of another particular set of content).

The instructions and/or data for selecting one of the plurality of sets of targeted content for display can include instructions and/or data indicating a value placed on a set of targeted content by the content provider that provides that set of targeted content. The content provider can specify that the value vary in accordance with the identity and/or a characteristic of a television viewer and/or a television viewing location.

The invention can be used generally to display any type of targeted content, such as, for example, targeted advertisements during commercial breaks during television programs or targeted content (e.g., targeted product placements) within a television program. In the former case, the invention can be implemented so that the targeted content continues to be shown even if a viewer changes the channel.

The invention can be implemented so that a viewer can indicate a response to display of a set of targeted content, such as, for example, a level of satisfaction with the display of the set of targeted content, a desire to view or not view the display of the set of targeted content again or a desire to view the display of a set of content that is related to the displayed set of targeted content. This aspect of the invention can be implemented to enable the viewer to indicate the response to the display of the content using voice recognition apparatus to enable the viewer to use spoken commands, visual recognition apparatus for discerning the response to the display of the content based on visual recognition of viewer motion or appearance of viewer motion or appearance, and/or a tactile input device. The invention can be implemented so that compensation from a content provider for display of the content provider's set of targeted content is dependent on the viewer response to display of the set of targeted content.

DETAILED DESCRIPTION

The invention enables content providers (e.g., advertisers) to effect the display of content (e.g., advertisements) at each of multiple content display sites of a content distribution network that is targeted to content observer(s) at that content display site. In particular, the invention can be used to enable content providers to effect the display of content at each of multiple television viewing locations (e.g., residences such as homes and apartments) of a television network (e.g., conventional television networks, cable television networks, digital television networks, satellite television networks) that is targeted to television viewer(s) at that television viewing location. However, aspects of the invention can have broader applicability and can be used in effecting targeted content displays to content observers at content display sites of any appropriate content distribution network, e.g., a computer network such as the Internet (and, in particular, the World Wide Web portion of the Internet), a radio network, a network of real-time changeable billboard displays). Further, though it is anticipated that the invention will often be used to effect targeted display of visual (e.g., video, text), audio or audiovisual content, the invention can be used to effect targeted display of any type of content, including content that is sensed, in whole or in part, by taste, smell or touch.

As discussed above, increased use of personal video recorders (PVRs) may produce a migration of advertising messages on television from conventional commercial breaks to product placements within a television program. The invention enables such product placements (or other content within a television program) to be targeted to particular television viewers and/or television viewing locations, with the possibility of selecting the content of the product placement from a wide variety of possible sets of targeted content. Further, the invention enables the content of targeted product placements (or other targeted content within a television program) to be integrated with surrounding content so that each version of the product placement is seamlessly integrated with the surrounding content. (Herein, the description of the invention is generally made with respect to product placements within a television program. However, it is to be understood that all aspects of the invention are generally applicable to the display of any targeted content within a television program.)

Figure 1:
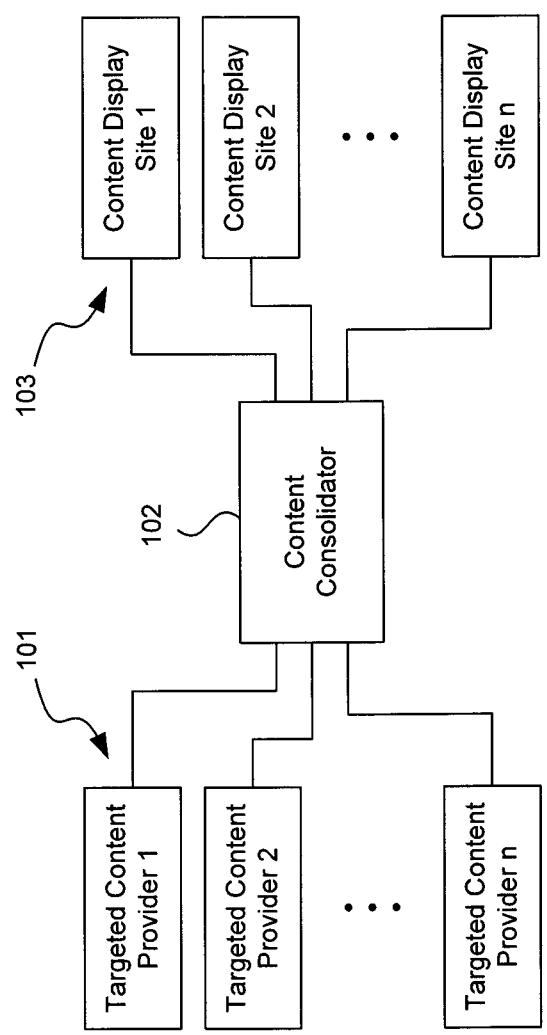
FIG. 1 is a block diagram of a content distribution network with which the invention can be used.

FIG. 1 is a block diagram of a content distribution network with which the invention can be used. Targeted content providers 101 each provide one or more sets of targeted content, each of which is intended for display to particular content observer(s) and/or content display site(s). In the system illustrated in FIG. 1, the sets of targeted content are transmitted to a content consolidator 102 which gathers sets of targeted content from the content providers 101 and transmits sets of targeted content to content display sites 103. For example, when the invention is used to effect the display of targeted television content, the content consolidator 102 can be embodied by a cable television system headend. Or, for example, when the invention is used to effect the display of targeted content on content display devices that are part of a computer network, the content consolidator 102 can be embodied by one or more server computers (e.g., one or more server computers used to implement a Web site). The invention can be implemented so that the content consolidator 102 transmits multiple sets of targeted content to a content display site 103 that can potentially be displayed during a targeted content display opportunity (e.g., a commercial break during a television program or between television programs, a product placement opportunity within a television program) at the content display site 103. At the time of the targeted content display opportunity at the content display site 103, an appropriate set of targeted content is selected (as described further below) at the content display site 103 for display to content observer(s) at that content display site 103 during the targeted content display opportunity. Alternatively, the invention can be implemented so that the content consolidator 102 selects an appropriate set of targeted content for display to content observer(s) at a content display site 103 and transmits only the selected set of targeted content to the content display site 103 for display at the content display site 103 during a targeted content display opportunity. (Other content can also be provided to the content display sites 103, e.g., television programs during or within which targeted content is to be displayed.) The content distribution network shown in FIG. 1 is merely illustrative of a manner in which the invention can be used; those skilled in the art will readily appreciate, in view of the description herein, that the invention can be used with other content distribution systems.

A system according to the invention for enabling and/or facilitating the display of targeted content to a content observer can include subsystems for delivering content to (and, in some implementations of the invention, storing content at) a content display site (e.g., providing different sets of targeted content to a data storage device associated with a television), identifying content observer(s) at a content display site (e.g., identifying television viewer(s)), selecting an appropriate one of multiple sets of targeted content to display during a targeted content display opportunity at a content display site and displaying the selected set of targeted content (e.g., selecting and displaying a particular version of an advertisement), and auditing the display of targeted content at a content display site (e.g., monitoring whether content observer(s) at a content display site observe the most important, i.e., highest value, set of targeted content during each targeted content display opportunity). Each subsystem—content delivery (and storage), content observer identification, content selection, and content display auditing—is described in more detail below. These subsystems and aspects of the invention are often described below in detail with respect to a particular implementation of the invention in which targeted content is displayed to television viewers. However, some of the subsystems or aspects thereof, or other aspects of the invention, can be applied broadly to the dissemination of targeted content over any network (e.g., a computer network such as the Internet), not just a television network.

The above-referenced U.S. patent application Ser. No. 09/724,786 (as indicated above, the disclosure of that application is incorporated by reference herein) describes an invention which enables content providers (e.g., advertisers) to effect the display of targeted content (e.g., advertisements) provided over a network for display to content observers (and, in particular, to enable content providers to display targeted content to television viewers). According to that invention, sets of targeted content can be stored in a data storage device associated with a content display system (e.g., a data storage device that is operably connected to, or integrated with, a set top box that is itself operably connected to, or integrated with, a television). The local data storage is used to store a large inventory of sets of targeted content that may potentially be deemed sufficiently valuable (e.g., of sufficient interest) to warrant display to content observer(s) at that content display site. One or more sets of targeted content are selected from this local inventory for display to content observer(s) observing the content display device at the content display site at the time of a content display opportunity. Those skilled in the art will readily appreciate that all of the mechanisms for acquiring, storing, managing and displaying targeted content described in that patent application can be used with the instant invention. According to the instant invention, each set of targeted content is a set of content to be displayed within (i.e., during and as part of) the display of a set of primary content (e.g., a television program). For example, as indicated above, the sets of targeted content can be different product placements that can be interchangeably displayed within a television program. ("Product placement" is used herein to refer to any content within a primary set of content that serves an advertising purpose.)

The above-referenced U.S. patent application Ser. No. 09/724,956 (as indicated above, the disclosure of that application is incorporated by reference herein) describes an invention which enables use of an auction system for selecting content—and, even more particularly, targeted content—for display to content observers. The above-referenced U.S. patent application Ser. No. 09/724,640 (as indicated above, the disclosure of that application is incorporated by reference herein) describes an invention which enables identification of content observers to facilitate the display of targeted content to those content observers. The above-referenced U.S. patent application Ser. No. 09/724,789 (as indicated above, the disclosure of that application is incorporated by reference herein) describes an invention that prevents unauthorized access to data produced as part of identification of a content observer. As will be readily appreciated by those skilled in the art, the methods and apparatus described in those patent applications can also be used together with the invention described herein.

As discussed above, the integration of replaceable virtual billboards or signs in a television program with surrounding content so that each version of the virtual billboard or sign is seamlessly integrated with the surrounding content is typically much easier to do than is the seamless integration of other types of changeable content, such as product placements in a television program. In the latter case, the replacement of one set of content with another must be undetectable, replacing the pixels in the image that represent the original content with new pixels representing the replacement content. This is a difficult problem because not only may portions of the replaceable content be obscured, but the lighting of, and reflections from, the replaceable content can change continuously. When replacing virtual signs or billboards in a video sequence, it is often desirable to have the sign or billboard pop out of the surrounding scene. In contrast, when replacing a product placement within a television program, it is desirable to match the original lighting, color and shadows as closely as possible.

A method in accordance with the invention for replacing a set of content (e.g., product placement) to be displayed within the display of a set of primary content (e.g., television program) with a different set of content targeted to particular content observer(s) and/or a particular content display site location can include the following four steps: finding the content to be changed, tracking the orientation of the changeable content as the content moves within successive video images, modeling the light reflected from the changeable content, and replacing the pixels of the old content with the pixels of the new content. The results of the first three of the four steps above are the same for each set of targeted content that can be inserted into the primary content. Therefore, to reduce processing requirements, it is desirable to perform those steps once and include the data representing the results in the video stream transmitted to a content display site. Such data can be sent either inband (i.e., together with the video) or out of band (i.e., via a separate data channel from that used to transmit the video). In the latter case, the data can even be sent at a different time and/or along a separate communications path from the video. Replacing the pixels of the old content with the pixels of the new content at the content display site is necessary if the sets of targeted content are stored at the content display site.

A method for tracking an object and generating an occlusion mask is described in, for example, U.S. Pat. No. 5,953,076, entitled "System and Method of Real Time Insertions into Video Using Adaptive Occlusion with a Synthetic Reference Image," by Astle et al., issued on Sep. 14, 1999, the disclosure of which is incorporated by reference herein. "Video Rewrite: driving visual speech with audio," by C. Bregler et al., Proceedings of 24th International Conference on Computer Graphics and Interactive Techniques, 1997, pp. 353-60 (and also described at www.interval.com/papers/1997-012/index.html), the disclosure of which is incorporated by reference herein, describes a technique for finding a face in a video stream. The techniques taught in U.S. Pat. No. 5,953,076 or the Bregler et al. paper can be used to find, track and replace content (e.g., product placement content) for use in a method or system according to the invention.

A method for modeling lighting conditions across an object with a linear gradient is described in "A multiresolution spline with application to image mosaics," by P. J. Burt et al., ACM Transactions on Graphics, vol. 2, no. 4, pp. 217-236, 1983, the disclosure of which is incorporated by reference herein. The techniques taught therein can be used to implement the modeling of light reflected from replaceable content (e.g., product placement content) in a method or system according to the invention. Those techniques enable determination of the manner in which the content surrounding replaceable content modifies the local light conditions about the replaceable content.

In a system or method according to the invention, the appearance of the original replaceable content is known. The light from the surrounding environment multiplies the reflectance of the original replaceable content to give the pixel values seen in the video signal used to generate the display of the original replaceable content. (See, e.g., Illumination and Color in Computer Generated Imagery, by Roy Hall, Springer-Verlag, 1988, the pertinent disclosure of which is incorporated by reference herein.) If it is known how the original replaceable content and the new replaceable content look in the same light, and if the old and the new replaceable content reflect light in the same fashion, the multiplication of the reflectance of the original replaceable content by the environmental light can be undone and a view of the new replaceable content generated instead. (A view of the new replaceable content can be generated even if the old and the new replaceable content reflect light differently; however, the integration of the new replaceable content with the surrounding content will not be as good as would otherwise be the case.)

Figure 2:
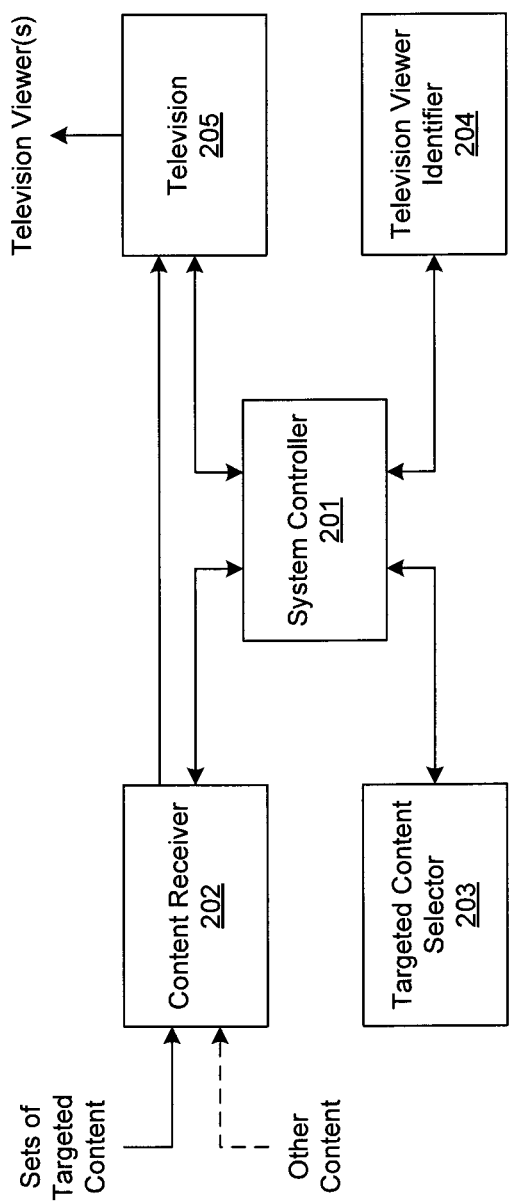
FIG. 2 is a block diagram of a system, according to an embodiment of the invention, for use at a television viewing location for displaying targeted content on a television at the television viewing location.

FIG. 2 is a block diagram of a system, according to an embodiment of the invention, for use at a television viewing location for displaying targeted content on a television at the television viewing location. The system includes a system controller 201, a content receiver 202, a targeted content selector 203, a television viewer or audience identifier 204 and a television 205. The system shown in FIG. 2 (as well as the systems according to the invention shown in FIGS. 3 through 8, described below) can be implemented (except for the television 205), for example, in an appropriately constructed television set top box including the functionality of such system as described herein. Such a television set top box (or other apparatus for embodying the systems of FIGS. 2 through 8) can readily be constructed by those of skill in the art in view of the description herein. The system controller 201 mediates and controls interaction among the other components of the system (the system could, alternatively, be implemented so that the functionality of the system controller 201 is distributed among one or more of the other components of the system shown in FIG. 2). Multiple sets of targeted content are received at the television viewing location by the content receiver 201. (Alternatively, as indicated above, an appropriate set of targeted content can be selected, in accordance with the principles of the invention, at a location remote from the television viewing location and transmitted to the television viewing location for display during a targeted content display opportunity.) Other content can also, but need not necessarily, be received by the content receiver 201, e.g., television programs within which targeted content is to be displayed. (It is anticipated that the invention will often be used to effect the display of targeted content during or within the display of other, "primary" content; however, the invention can also be used to produce targeted "primary" content displays.) The content receiver 201 also receives information regarding the desired audience for each set of targeted content (as described in more detail below). (This information is not transmitted to the television viewing location if the set of targeted content is selected at a location remote from the television viewing location.) When a targeted content display opportunity arises, the television viewer or audience identifier 204 identifies the television viewer(s) viewing the television 205 at that time and/or identifies the television viewing location (as described in more detail below). (Alternatively, the television viewer or audience identifier 204 can have previously identified the television viewing location and/or likely television viewer(s) at the television viewing location, the latter based on information previously obtained regarding television viewer(s) at the television viewing location.) The system controller 201 communicates to the targeted content selector 203 information regarding the identity and/or a characteristic of the television viewer(s) and/or the television viewing location, as well as information regarding the desired audience (i.e., television viewer(s) and/or television viewing location) for each set of targeted content that can potentially be displayed during the targeted content display opportunity. The targeted content selector 203 selects one of the sets of targeted content for display to the television viewer(s) during the targeted content display opportunity. In particular, an important aspect of the invention is that the invention can enable selection of a set of targeted content in accordance with a criterion based on the identity and/or a characteristic of the television viewer(s) viewing the television at the time of the content display opportunity (as described in more detail below). The selected set of targeted content is provided to the television 205 for generation of a display of that set of targeted content.

A content provider can specify a desired audience for its content by specifying the locations of content display sites (e.g., household addresses within a specified geographic region) at which the content provider would like its content displayed or by indicating the demographics of the content observers that the content provider is trying to reach. A content provider can also specify a desired audience for its content by identifying particular individuals or small groups of individuals (e.g., families) to whom to display its content, and/or particular content display sites (e.g., particular household addresses) at which to display its content; however, it is anticipated that such an approach will typically be more cumbersome than is desirable. Content display site locations can be ascertained by a content provider in any appropriate manner. For example, when the invention enables display of targeted television content, content display site locations can be recorded by installers who install set top boxes in accordance with the invention at content display sites (e.g., households). This information can be then be passed on to content providers. Demographic data can be obtained, for example, directly from content observers (e.g., by implementing a television set top box in accordance with the invention and providing an appropriate input device that enables a television viewer to specify demographic information regarding themselves and/or other potential television viewers at the television viewing location) or obtained from a direct marketing company, such as Donnelley Marketing of Omaha, Nebr.

Figure 3:
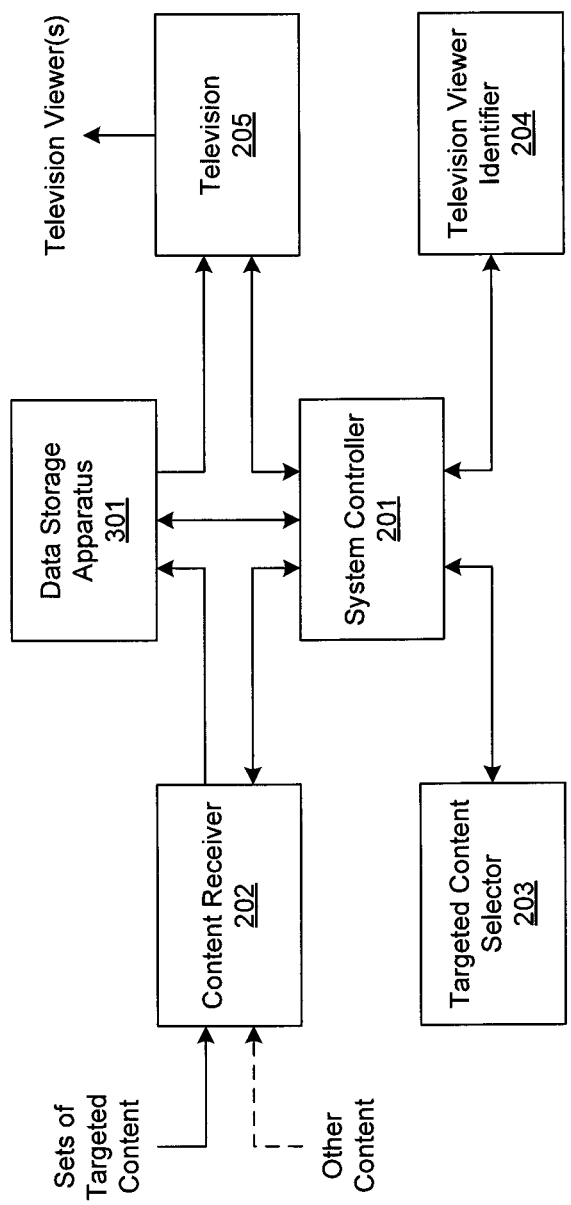
FIG. 3 is a block diagram of a system, according to another embodiment of the invention, for use at a television viewing location for displaying targeted content on a television at the television viewing location, in which sets of targeted content received at the television viewing location are stored in a data storage device located at the television viewing location.

The invention can advantageously be implemented so that different sets of targeted content (e.g., different advertisements or product placements, different versions of an advertisement or a product placement) are stored in a data storage device associated with a content display system or device (e.g., television) that will be used to display one or more of the sets of targeted content. (For convenience, such a content display system or device is usually referred to herein simply as a content display device.) For example, when the invention is implemented to enable display of targeted television content, sets of targeted content can be stored on a data storage device that is operably connected to, or integrated with, a set top box that is itself operably connected to, or integrated with, the television. The invention can make use of such "local" data storage to store a large inventory of sets of targeted content that may potentially be deemed sufficiently valuable (e.g., of sufficient interest) to warrant display to content observer(s) at that content display site. The invention can be implemented so that all available sets of targeted content are transmitted to all content display sites or so that only sets of targeted content which it has been determined, based on the content display site location and/or the demographics of the content observer(s) at the content display site, can potentially be displayed at a content display site are transmitted to the content display site. As indicated above and discussed in more detail below, one or more sets of targeted content are selected from this local inventory for display to content observer(s) observing the content display device at the content display site at the time of a content display opportunity. FIG. 3 is a block diagram of a system, according to another embodiment of the invention, for use at a television viewing location for displaying targeted content on the television 205 at the television viewing location, in which sets of targeted content received at the television viewing location are stored in a data storage device 301 located at the television viewing location.

The invention can be implemented so that sets of targeted content are delivered to a content display site so as to reduce or eliminate interference with a content observer's interaction with the content display device at the content display site. For example, sets of targeted content can be delivered at times when the content display device is being used little or not at all (e.g., at night). Or, for some implementations of the invention, sets of targeted content can be delivered via a data path that is different from a data path over which the content display device is receiving other content and/or other data. For example, when the invention is implemented to enable display of targeted television content, sets of targeted content can be delivered to a television viewing location via an IP connection during times at which data for a current television broadcast is also being received by the television.

Sets of targeted content can either be "pushed" or "pulled" to a content display site. For example, when the invention is implemented to enable display of targeted content during television programs, in a "broadcast" mode the targeted content and corresponding display instructions can be sent continuously ("pushed") to a television set top box by a cable television system's headend. When the set top box is otherwise unoccupied (e.g., when the set top box is not receiving signals for a television broadcast), the set top box can be tuned to the channel over which the targeted content is being broadcast to receive as many sets of targeted content as can be received during the available time and/or as can be stored by an associated data storage device. Alternatively, the set top box can "pull" (i.e., request delivery of) targeted content over an alternate pathway (such as a cable modem). When the sets of targeted content (e.g., advertisements or product placements) are "pulled," the invention can be implemented so that only particular sets of targeted content are obtained, in accordance with the identity/ies and/or characteristic(s) of the content display site location and/or the demographics of the content observer(s) at the content display site. This can be desirable to efficiently use the data storage capacity at the content display site.

Figure 4:
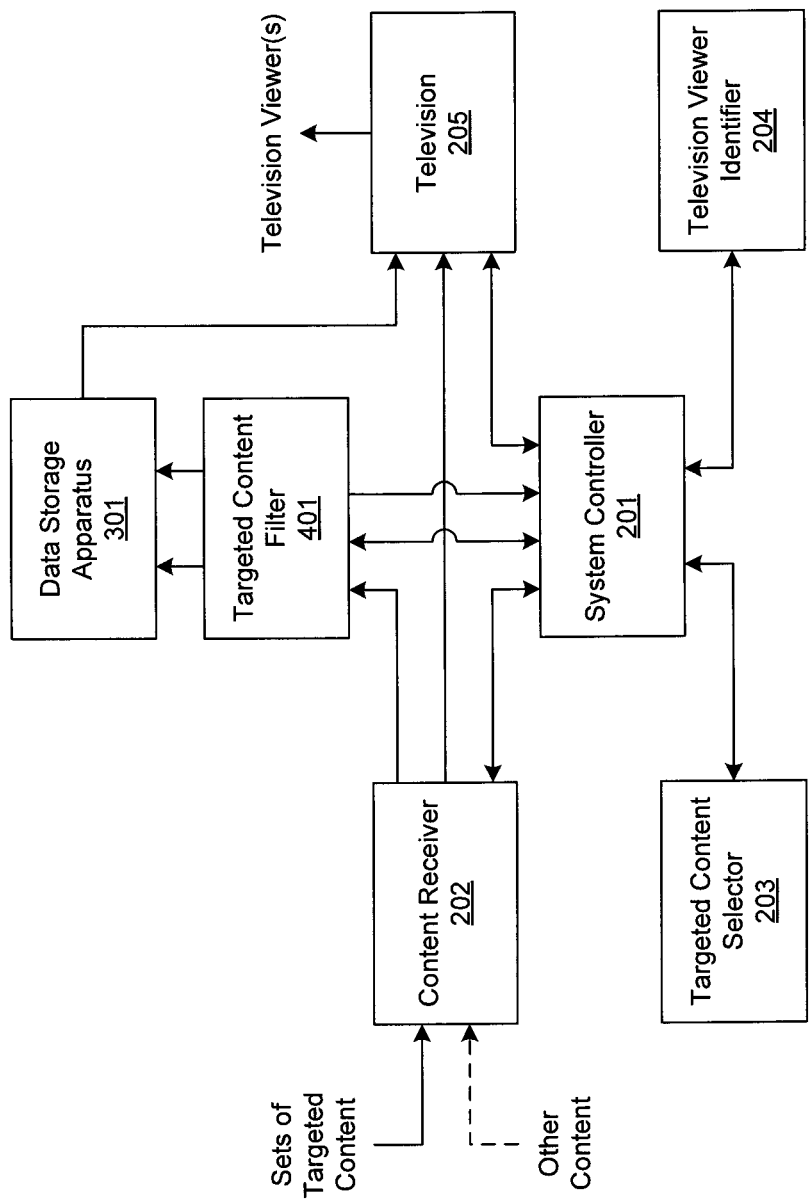
FIG. 4 is a block diagram of a system, according to yet another embodiment of the invention, for use at a television viewing location for displaying targeted content on a television at the television viewing location, in which sets of targeted content received at the television viewing location must successfully pass through a targeted content filter before being stored in a data storage device located at the television viewing location.

To conserve space in a data storage device used to store sets of targeted content at a content display site, one or more filters can be used to prevent the storage of received sets of targeted content that satisfy (or don't satisfy, depending upon the implementation) one or more criteria. For example, sets of targeted content that can be identified as directed to children can be excluded from storage in the data storage device if the content display site is known to be a household without children. Or, conversely, sets of targeted content that can be identified as unsuitable for children (e.g., content that is sexually explicit or excessively violent) can be excluded from storage in the data storage device if the content display site is known to be a household with children. Such filtering can be accomplished, for example, by evaluating data describing the content (e.g., identifying the subject matter of the content) that often accompanies the data representing the content itself. FIG. 4 is a block diagram of a system, according to yet another embodiment of the invention, for use at a television viewing location for displaying targeted content on the television 205 at the television viewing location, in which sets of targeted content received at the television viewing location must successfully pass through a targeted content filter 401 before being stored in the data storage device 301 located at the television viewing location.

Other methods can also be used to conserve space in a data storage device used to store sets of targeted content at a content display site. For example, a set of targeted content can be deleted from the data storage device after having been displayed a predetermined number of times or after passage of a predetermined duration of time since the set of targeted content was received at the content display site.

In addition to receiving sets of targeted content, a content display site can receive instructions and/or data for use in determining whether to display a set of targeted content during a particular targeted content display opportunity. These instructions and/or data may be delivered to the content display site together with corresponding set(s) of content. Instructions and/or data for determining whether to display a set of targeted content (e.g., the value of a set of targeted content to a content provider, discussed below) can, and often will, depend on the identit(ies) and/or characteristic(s) of the content observer(s) to whom, and/or the content display site at which, a set of targeted content is to be shown.

The instructions and/or data for determining whether to display a set of targeted content can also include instructions and/or data regarding when and/or when not to display a set of targeted content. For example, a content provider can specify particular times or ranges of times at which a set of targeted content can or cannot be displayed. These times can be absolute (e.g., a particular clock time on a particular day, a particular day or days during a week, after or before a specified date) or relative (e.g., not before or after a specified duration of time since another event, such as another display of the same content; not before, after or during display of a particular kind or set of content). A content provider can also specify a maximum number of times that a set of targeted content can be displayed or a maximum frequency that a set of targeted content can be displayed (especially at a particular content display site and/or to particular content observer(s)). A content provider can also specify constraints on the temporal proximity of display of a set of targeted content to the display of other content (e.g., the temporal proximity of display of a set of targeted content to another display of the same set of targeted content, the temporal proximity of display of a set of targeted content to the display of content of a particular type, the temporal proximity of display of a set of targeted content to the display of another particular set of content, the temporal proximity of display of a set of content to the display of other content at a particular content display site and/or to a particular content observer). For example, a content provider may specify that their content should only be displayed at certain times of the day, not during particular television programs, or not within a specified number of hours of previous display of the content to the same content observer. As an illustration of such instructions, when the invention is implemented to enable display of targeted advertisements during television programs, the instructions might be of the form "only display this advertisement during 'Ally McBeal,'" or "never play this advertisement during a wrestling show."

The conditions regarding when and when not to display a set of targeted content can be specified as hard constraints regarding the content display that are not to be relaxed when making determinations regarding which set of targeted content to display at a content display site. In determining which of multiple sets of targeted content to display at a particular time to particular content observer(s) and/or at a particular content display site, all sets of targeted content having a hard constraint associated therewith that specifies that the set of targeted content is not to be shown to a content observer at that time, or to those content observer(s) and/or at the content display site, is eliminated. This may be the case, for example, when a set of targeted content has been displayed recently to the content observer(s) and/or at the content display site, has already been shown too many times to the content observer(s) and/or at the content display site, or has been prohibited from being shown during a current program. The invention is preferably implemented so as not to violate the hard constraints because displaying a set of targeted content in violation of such a constraint may damage the content provider's reputation, dilute the content provider's message or otherwise impair the content provider's attempt to communicate successfully with the content observer(s).

The instructions and/or data for determining whether to display a set of targeted content can include, for example, instructions and/or data indicating the "value" (i.e., what a content provider is willing to pay for display or, more particularly, what a content provider is willing to pay for display to particular content observer(s) and/or at particular content display site(s)) of a corresponding set of targeted content. The use of instructions and/or data indicating the "value" that a content provider places on the display of a set of targeted content is described in more detail in the above-referenced U.S. patent application Ser. No. 09/724,956 (as indicated above, the disclosure of that application is incorporated by reference herein); the auction mechanisms described in that application can be advantageously used with the invention described herein. In addition to storing a collection of sets of targeted content on a data storage device associated with a content display system, data regarding bids by content providers for display of a set of targeted content that they provide and instructions for using the bids, together with other information (as necessary or desirable), to determine when and to whom to show each set of content, can also be stored on the data storage device. The invention can be implemented so that just before each time at which targeted content can be displayed, a determination is made regarding who is observing the content display device and a set of targeted content is chosen for display on that content display device in accordance with bids made by content providers for the content observer's attention. In general, the set of targeted content that is selected and displayed is the one for which the corresponding content provider has made the highest bid. (However, this may not always be the case, as described in more detail in the U.S. patent application Ser. No. 09/724,956; in particular, the goal of maximizing total payments by content providers for all targeted content display opportunities can result in selection, for a particular targeted content display opportunity, of a set of targeted content having an associated bid that is less than that of the bid associated with another set of targeted content.)

The invention can be implemented so that the presence of multiple content observers at the time of a targeted content display opportunity is detected (and salient characteristics of those content observers determined). The content providers' bids can be dependent on the number and characteristics of the content observers present at a content display site at the time of a targeted content display opportunity. For example, if a content provider has agreed to pay an amount W for the attention of a type X content observer and an amount Y for the attention of a type Z content observer, then the invention can be implemented so that the bid from that content provider when two type X content observers and one type Z content observer are present is 2W+Y. (Or, a discount can be given when multiple content observers are present, i.e., the amount of the bid is between 2W+Y and the greater of W and Y.)

The determination of the identity and/or characteristic(s) of a content observer observing a content display device at any given time can be made using data obtained in a variety of ways. (The identity and/or characteristic(s) of the content observer(s) observing the content display device at a particular time can be used to determine which set of targeted content to display at that time.) Ways of determining the identity and/or characteristic(s) of a content observer in the vicinity of a content display device (a content observer in the vicinity of the content display device is presumed to be observing the content display device) are described in detail in the above-referenced U.S. patent application Ser. Nos. 09/724,640 and 09/724,789 (as indicated above, the disclosure of each of those applications is incorporated by reference herein). The methods and apparatus for determining the identity and/or characteristic(s) of a content observer described herein and in the U.S. patent application Ser. Nos. 09/724,640 and 09/724,789 can be used both for identifying content observer(s) present in the vicinity of a content display device at a particular time (e.g., at, or just prior to, the time of a targeted content display opportunity, so that appropriate targeted content can be displayed to the content observer(s) during that targeted content display opportunity) and for generally identifying content observer(s) who have been present in the vicinity of a content display device at a content display site during previous content displays (and are therefore likely to be present in the vicinity of the content display device during a present or future targeted content display opportunity, which information can be used to select targeted content for display at the content display site during such targeted content display opportunity).

For example, characteristic(s) of the observation of content at a content display site (e.g., the type of content displayed and/or the manner of display of content) can be used to enable determination of the identity and/or a characteristic of a content observer at the content display site. Further, information about the display environment can be combined with information about the content observer's habits in observing content to identify a content observer. For example, information obtained by one or more devices that sense one or more physical characteristics of the people present in the vicinity of a content display device at the content display site (e.g., one or more visual data acquisition devices, such as camera(s), and/or one or more audio data acquisition devices, such as microphone(s)) can be combined with information regarding the content observation behavior at the content display site to identify content observer(s) at the content display site. Demographic information regarding possible content observers at a content display site can also be combined with information regarding the content observation behavior at the content display site to identify content observer(s) at the content display site. All three types of information (content observation behavior, physical characteristics of content observers, demographic information regarding possible content observers) can also be combined to enable identification of content observers at the content display site, enhancing the accuracy of the identification. The invention enables physical characteristics of content observers at a content display site and/or demographic information regarding possible content observers at the content display site to be connected with information regarding the observation habits of a content observer to enable the identity of the content observer to be known with an acceptable degree of certainty.

The display of content at a content display site can be monitored so that one or more characteristics of the observation of content at the content display site can be determined for use in identifying content observer(s) who have observed particular content or observed content in a particular manner. When the invention is implemented to enable display of targeted content by a television, for example, a set top box can be used to identify and store data regarding which channel is being viewed and how often, and to which other channels each viewer changes the channel. Demographic information associated with such content observation characteristics can be used to characterize content observer(s) in the vicinity of the content display device (who are presumed to be watching the content display device) at the time the content observation occurred.

For example, when the invention is implemented to enable the display of targeted content by a television, the channels and/or programs each viewer watches can indicate a lot about the viewer. The demographic information about each television program or channel that is watched represents probabilities that a viewer of that television program or channel has a demographic characteristic described by that demographic information. As is well known to those skilled in the art, a large variety of demographic characteristics can be used to characterize television viewers (or, more generally, content observers of any content display system). Demographic characteristics can include, for example, age ranges (e.g., 12-18, 19-25, 25-35), gender and income.

More precise identification of a television viewer is possible if demographic information is combined from multiple channels and/or programs. Given a list of television programs and/or channels watched by a viewer, the probabilities of any particular value of a demographic characteristic can be multiplied together to get an estimate of the probability that the viewer is characterized by that value of the demographic characteristic. After calculating this probability for all values of a demographic characteristic, the value having the highest probability can be selected as the most likely value of the demographic characteristic for the viewer. Thus, the viewer is "identified" as a person having the selected demographic characteristic. As can readily be appreciated, the value of multiple demographic characteristics for a viewer can be determined in this manner.

The foregoing assumes that the probabilities of values of demographic characteristics ("demographic probability information") for each channel or program are independent of those for other channels or programs, so that the demographic probability information for multiple channels or programs can be combined by simple multiplication. However, this is not always the case, i.e., the demographic probability information for multiple channels or programs may be dependent, not independent. For example, the viewers of Star Trek also tend to watch Deep Space 9. Combining the demographic probability information from these two programs does not produce much additional information about the demographic characteristics of a viewer over that provided by the demographic probability information for one of those programs alone.

One response to the above is to only combine demographic probability information for channels or programs for which the demographic probability information is likely to be independent. For example, combining demographic probability information by multiplying probabilities from a news program and a comedy program can produce a more accurate demographic profile of a probable viewer since it is likely that the demographic probability information of those quite different programs is statistically independent.

Additionally, those skilled in the art of statistical analysis will readily appreciate how existing techniques for dealing with dependent probabilities can be used with the invention to glean as much identifying information as possible in situations in which the demographic probability information for different channels or programs is dependent. Some such techniques are described in, for example, "Unsupervised learning minimum risk pattern classification for dependent hypotheses and dependent measurements," by C. G. Hilborn, Jr. et al., IEEE Transactions on Systems Science and Cybernetics, vol. ssc-5, no. 2, April 1969, pp. 109-115, the disclosure of which is incorporated by reference herein.

As indicated above, characteristics of the manner in which a content display device is observed can also be used to assist in identification of a content observer. For example, in identifying television viewers, rudimentary gender distinctions can be based on frequency of channel switching (men are believed to switch channels more frequently than women).

Figure 5:
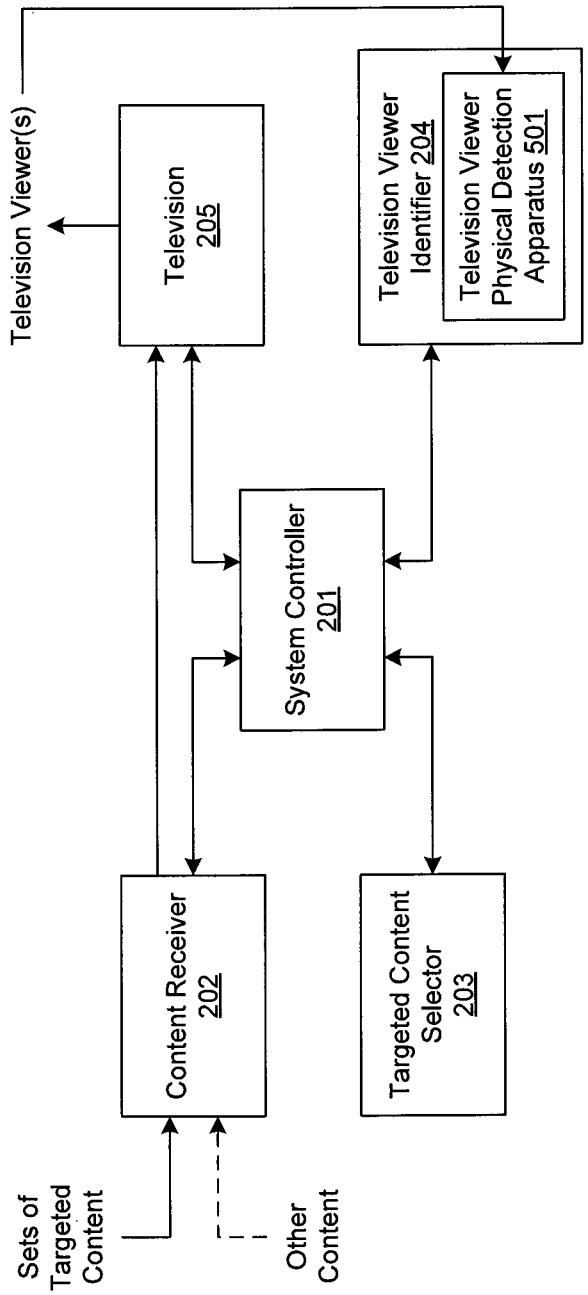
FIG. 5 is a block diagram of a system, according to still another embodiment of the invention, for use at a television viewing location for displaying targeted content on a television at the television viewing location, in which a television viewer physical detection apparatus can sense physical characteristic(s) of a television viewer present in the vicinity of a television which can be used to facilitate identification of that television viewer.

As indicated above, one or more devices can be used to sense physical characteristics of the people present in the vicinity of a content display device, which information may then be used to associate viewing habits with a person having particular physical characteristics. Such sensing devices can include, for example, a visual data acquisition device (such as a camera) for use with a face recognition system, an audio data acquisition device for use with a voice recognition system, a fingerprint scanning device and/or a retinal scanning device. The data obtained by such devices can be processed, if necessary, to enable the data associated with one content observer to be distinguished from that associated with each other content observer. FIG. 5 is a block diagram of a system, according to still another embodiment of the invention, for use at a television viewing location for displaying targeted content on the television 205 at the television viewing location, in which a television viewer physical detection apparatus 501 can sense physical characteristic(s) of a television viewer present in the vicinity of the television 205 which can be used to facilitate identification of that television viewer.

A camera (or other visual data acquisition device) can be used to obtain visual images of an area in the vicinity of a content display device. A visual data acquisition device for use in the invention can be implemented using any appropriate visual image recording technology (e.g., conventional camera). It is desirable that the visual data acquisition device have the capability to sense people over a wide angle of viewing positions. One way to do this is to rotate a horizontally mounted line sensor (such as can be found in many inexpensive scanners) about a horizontal axis to scan in the height dimension. The scan does not have to be particularly fast to enable sensing of who is present at the display location.

Face identification methods can be used to indicate the presence of a face in such visual images and give a measure of how much a particular face in a visual image is like another in a database of facial images. For example, a clustering algorithm can be used to group the facial images identified by a face identification method into individual people (at this point, these people are still anonymous). (Particular face identification methods that can be used with the invention are described in more detail in the above-referenced U.S. patent application Ser. Nos. 09/724,640 and 09/724,789, the disclosures of which are incorporated by reference herein, as indicated above.) The display of content at the content display site can be monitored to associate particular content displays or manners of displaying content with content observer(s) (i.e., facial images) that are present during such content display. Characteristics associated with a particular content display or manner of displaying content can then be used to identify the content observers by associating one or more such characteristics (such as gender and/or age) with each content observer. (A more accurate identification of content observers can be made if demographic information regarding the content display site indicates the number and other identifying information of possible content observer(s) at the content display site, as discussed further below.)

In addition to, or instead of, the use of a visual data acquisition device, an audio data acquisition device (e.g., one or more microphones) can be used to obtain a recording of sounds in the vicinity of a content display device. A voice recognition method can then be used to enable the identification of a content observer in a manner analogous to that described above with respect to use of face identification. (The use of voice recognition for identification of content observer(s) is advantageous in that voice recognition can also be used to enable a content observer to control the content display device using spoken commands.) Current speech recognition systems operate adequately for small vocabularies. Using echo cancellation techniques that are common in speakerphones, the known sound from a television's speaker(s) can be canceled. The remaining audio signal can then be processed by a speech recognition system which recognizes a small number of commands that can be used to control the content display device, such as, for example, "next commercial" or "show me more". Speaker identification techniques, such as those described in "Automatic speaker recognition using Gaussian mixture speaker models," by D. A. Reynolds et al., Lincoln Laboratory Journal, MIT, vol. 8, no. 2, Fall 1995, pp. 173-192, the disclosure of which is incorporated by reference herein, can enable the sensed speech to be clustered, each cluster representing an individual (anonymous) person. The display of content at the content display site can be monitored to associate particular content displays or manners of displaying content with content observer(s) (i.e., voices) that are present during such content display, as indicated by detected speech.

A fingerprint scanning device or retinal scanning device can also be used to facilitate the identification of a content observer. The data obtained by such devices for each content observer is sufficiently unique that the data need not be further processed to enable the data associated with one content observer to be distinguished from that associated with another content observer. The fingerprint or retinal scanning devices are preferably implemented so that the fingerprint or retinal scan occurs without need for the content observer to take special action. For example, a fingerprint scanning device can be implemented in a user input device that is necessary for operation of the content display system (e.g., a remote control device for operation of a television, a keyboard or mouse for operation of a computer) so that a content observer naturally grasps the input device in a manner that enables a fingerprint scan to be done automatically each time that a content observer uses the input device to operate the content display system. Fingerprint scanning devices and retinal scanning devices that can readily be modified for use with the invention are known to those skilled in that art. For example, fingerprint scanning devices such as those available from Identix Incorporated of Sunnyvale, Calif. can be modified for use with the invention.

After certain physical characteristics of content observer(s) at the content display site have been identified, the calculation of probabilities of values of demographic characteristics accurately describing content observer(s), as described above, can be used together with the information regarding the physical characteristics of content observers to provide an identification of the content observer(s) present in the vicinity of the content display system at any given time. As the available demographic information is increased, the identity estimates can be refined (i.e., have a higher probability of being correct).

Demographic information regarding the people present at a content display site that may observe a content display can also be used to predict which of multiple possible content observers at a content display site is most likely observing a particular content display. Demographic information (e.g., number of people present in a household and their ages, household income) can be obtained from companies such as Donnelley Marketing of Omaha, Nebr. (see, e.g., www.donnelleymarketing.com/prodserv/listmang/wkb2.html). This information can be used with information regarding content observation behavior (described in detail above), with or without information regarding the physical characteristics of a content observer observing a particular content display, to predict the likely content observer(s) observing a content display. For example, each television program has specific demographic data associated therewith indicating how many people of each age range and gender are, on average, watching the program. This data can be used to predict who is watching. Thus, for example, if 20% of the viewers of a television program are in the same demographic group as the mother in household, 35% of the viewers are in the same demographic group as the father in a household, and 5% of the viewers are in the same demographic group as the child in a household, the most likely viewer, without any further information, is the father. Such determinations can be made using, for example, Nielsen data regarding television watching.

As described above, static information (e.g., physical characteristics of a content observer, demographic information regarding possible content observers, information regarding content observer(s)' observation behavior) can be used to enable identification of a content observer. Changes in that information (e.g., changes in observation behavior) can also be evaluated to enable identification of a content observer. For example, a person who suddenly started watching television programs about health could be identified as a person likely to be very interested in exercise products.

A determination of the identity of a content observer can still be made, albeit with lower accuracy, if any of the foregoing information is missing. For example, without the information provided by a camera (or other device for sensing a physical characteristic of content observer(s)) the demographic characteristics of individual content observers at a content display site can not be inferred with certainty. Or, for example, if only viewing history from one television program is available, only a rudimentary guess can be made about the viewer's identity. However, because of the known value of successfully targeting content, content providers (such as television advertisers) are satisfied with content observer identifications of even very low certainty. The higher the confidence in identification of the content observers, the more a content provider will be willing to pay for display of its content to content observer(s) who have been identified as fitting a profile of interest to the content provider.

For example, the determination of the identity of a content observer can be accomplished by evaluating content observation behavior alone. This behavior can be compared to behavior that a content provider has specified as likely to identify a content observer whom the content provider is interested in reaching. For example, a seller of travel services may want to identify television viewers who are travel buffs so that they can display their content to such viewers. A determination as to whether a viewer has such a characteristic can be made by monitoring the content that is or has been viewed by the viewer: if the viewer is watching a travel program, or if the viewer watches a travel program with greater than a specified frequency (determined as percentage of all types of programs watched and/or as a temporal frequency), then a relatively high probability can be assigned to the conclusion that the viewer is a travel buff and thus is the type of viewer which the travel services seller seeks to reach. Further, as the amount of content observation information obtained increases (e.g., information regarding viewing of multiple television programs), the accuracy of the content observer identification increases.

Some content observers may be concerned about misuse of confidential information obtained as part of identification of content observers as described above. The techniques described in the above-referenced U.S. patent application Ser No. 09/724/789 can be used to protect confidential information regarding the content observers (as indicated above, the disclosure of that application is incorporated by reference herein). Further, privacy concerns can also be alleviated by not explicitly identifying a content observer, but, rather, identifying each content observer with a non-descriptive, generic symbol (e.g., a geometric symbol) or other identification tag (e.g., alphanumeric descriptor), the characteristics of a particular content observer being associated with each symbol or tag. The generic symbols or tags for content observers can be displayed to the content observers, offering reassurance to the content observers regarding the secrecy of their identity and confidential information describing them.

As described above, the identity and/or characteristic(s) of a content observer can be determined by making use of information regarding past content observation behavior, demographic information, information regarding physical characteristic(s) of television viewer(s) present in the vicinity of the television during past content displays, some combination of such information, or all of such information. As also described above, the methods and apparatus for determining the identity and/or characteristic(s) of a content observer described herein can be used both for particularly identifying content observer(s) present in the vicinity of a content display device at a particular time and for generally identifying content observer(s) who may be present in the vicinity of a content display device (based on monitoring of past content displays), so that, in either case, appropriate targeted content can be displayed to the content observer(s). Given information about the content observer(s) in front of a content display device (e.g., viewer(s) in front of the television), a set of targeted content (e.g., an advertisement or a product placement) can be selected for display during a targeted content display opportunity (e.g., the beginning of an advertising opportunity, which might be a commercial break in a television program or a product placement opportunity within a television program) from multiple sets of targeted content (e.g., from an inventory of targeted content stored on a data storage device at the content display site) that could potentially be displayed during the targeted content display opportunity. In particular, the invention advantageously enables a set of targeted content to be selected for display in accordance with a criterion based on the identity and/or a characteristic of the content observer(s) observing the content display device at the time of the targeted content display opportunity. The invention can also be implemented so that a set of targeted content is, additionally or alternatively, selected for display in accordance with a criterion based on the identity and/or a characteristic of the content display site, e.g., the address of the content display site. For example, a set of targeted content can be selected based on the degree to which the age, gender, income and/or interests of the content observer(s) present at the time of the targeted content display opportunity matches the age, gender, income and/or interests of content observers to whom a content provider desires to appeal with the set of targeted content. As an illustration, if a content display device is being watched by a content observer who is known to be interested in sports, an advertisement for an upcoming broadcast of a sporting event or an advertisement for sports equipment can be displayed. Alternatively or additionally, a character in a television program can be displayed wearing a baseball cap bearing the logo of a sports team or sports equipment manufacturer. As can readily be appreciated, the possibilities for characterizing content observers and selecting targeted content for display based on those characterizations are nearly endless.

Figure 6:
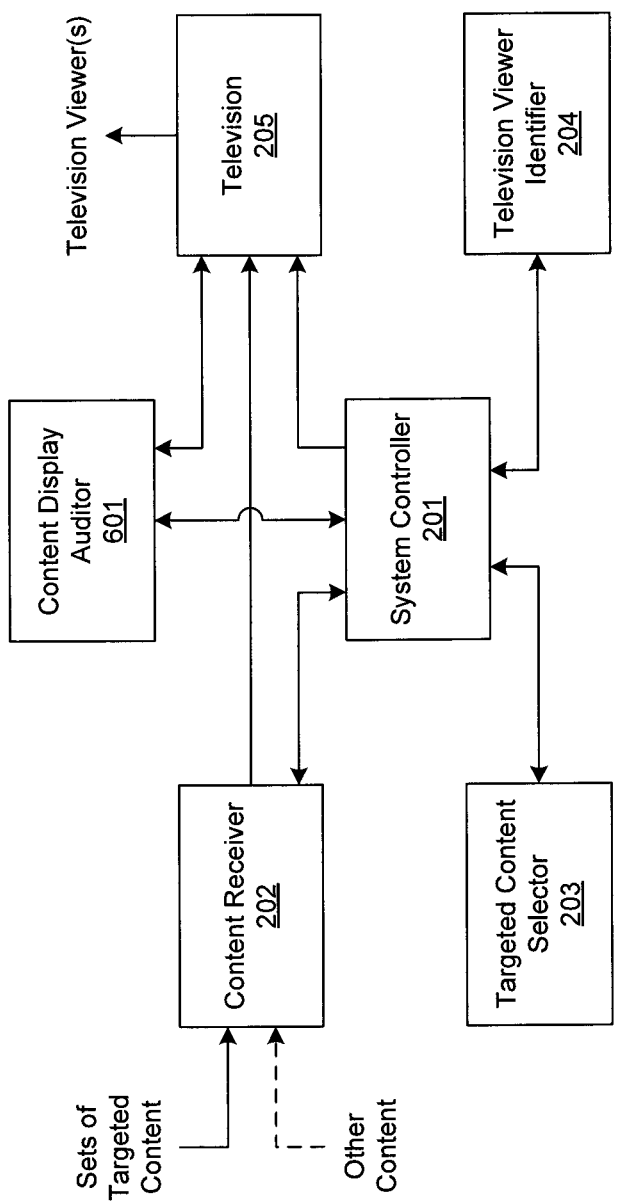
FIG. 6 is a block diagram of a system, according to another embodiment of the invention, for use at a television viewing location for displaying targeted content on a television at the television viewing location, in which the display of content (and, in particular, the display of sets of targeted content) at the television viewing location by the television is monitored by a content display monitor.

The invention can enable the display of content (and, in particular, the display of sets of targeted content) to be audited. FIG. 6 is a block diagram of a system, according to another embodiment of the invention, for use at a television viewing location for displaying targeted content on the television 205 at the television viewing location, in which the display of content (and, in particular, the display of sets of targeted content) at the television viewing location by the television 205 is monitored by a content display monitor 601.

For example, when a set of content is displayed, a counter associated with that set of content can be incremented indicating that the set of content has been displayed. A counter associated with each content observer observing the content display at that time can also be incremented indicating how often a particular content observer has observed that particular set of content. (The presence of content observer(s) at the time of a content display can be ascertained using techniques as described above.) These two counters are separate. The first counter represents aggregate information which can be used, for example, to indicate how much is owed by each content provider (e.g., advertiser) for the display of their set(s) of targeted content. The second counter can be used, for example, to facilitate identification of a content observer, as described above, or to determine whether or not to display a set of targeted content to a content observer.

The invention can be implemented so that content observer behavior during a content display is monitored and included as part of the auditing information. For example, when the invention enables display of targeted advertisements during and/or product placements within television programs, the invention can be implemented so that the amount owed by an advertiser for display of the advertiser's advertisement and/or product placement depends on the viewer behavior that the advertisement and/or product placement induces. For instance, a different amount can be charged for the display of an advertisement and/or product placement when the viewer changes the channel during display of the advertisement than is charged if the viewer doesn't change the channel during display of the advertisement and/or product placement.

To preserve the anonymity of the content observer(s), the invention can be implemented so that the only auditing information collected concerns which content has been shown and under what conditions (e.g., the generic characteristics of the content observer(s), any information relevant to collecting payment for display of targeted set(s) of content).

The invention can be implemented so that, once collected, the auditing information is transmitted from the content display site to a different location. For example, the invention can be implemented so that all auditing information is transmitted to a neutral third party. Alternatively or additionally, the invention can be implemented so that the auditing information for each set of targeted content is transmitted to the corresponding content provider. The transmission of auditing information can be done in real time as the auditing information is acquired. Alternatively, auditing information can be collected for a period of time and a collection of auditing information transmitted from the content display site together at one time. In the latter case, it can be desirable to transmit the auditing information from the content display site at a time when communication costs are low (e.g., late at night).

The invention can be implemented in a variety of ways to provide enhanced value to content providers. For example, when the invention enables display of targeted television content, the invention can be implemented so that the same set of targeted content (e.g., advertisement) can be displayed even as a viewer changes channels, thus guaranteeing that that particular set of targeted content is displayed to the viewer. (Techniques for speeding up a live broadcast, such as are described in U.S. Pat. No. 6,005,564, can be used to ensure that the viewer doesn't miss any broadcasted content on the new channel.) As indicated above, the invention can also be implemented to keep track of the number of times each content observer has observed a particular set of targeted content. This can, for example, enable the number of times that a set of targeted content has been displayed to be controlled so as to ensure that each content observer has seen the set of targeted content often enough to get the message, but not so frequently that the content observer becomes annoyed by display of that set of targeted content.

Figure 7:
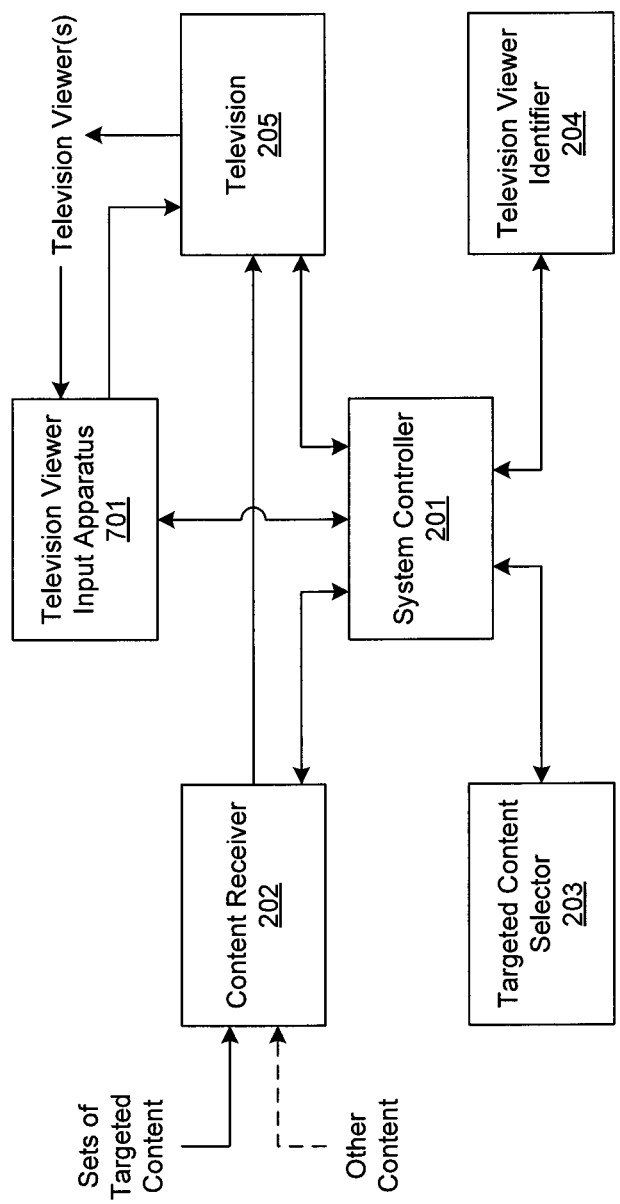
FIG. 7 is a block diagram of a system, according to yet another embodiment of the invention, for use at a television viewing location for displaying targeted content on a television at the television viewing location, in which a television viewer input apparatus enables a television viewer to interact with the television and/or other components of the system.

The invention can also be implemented to enable content observers to indicate a level of satisfaction with, or other response regarding, the display of a particular set of targeted content. Additionally, the invention can be implemented to enable content observers to indicate whether they would like to observe a set of targeted content again and/or observe related set(s) of content. For example, upon viewing a Stair-Master advertisement, a television viewer might decide that they want to buy other exercise equipment and indicate that they would like to see one or more (or all) related sets of content (e.g., advertisements for other exercise equipment, educational segments regarding health benefits of exercise). This aspect of the invention can be implemented in a variety of ways. (The above-referenced U.S. patent application Ser. No. 09/514,056 describes in more detail methods and apparatus that can be used in implementing this aspect of the invention.) For example, a remote control device used to control the content display device on which the sets of targeted content are displayed can include buttons (or other tactile interface mechanisms) that enable the content observer to specify appropriate instructions regarding future display of content by the content display device (e.g., a button that specifies the content should not be shown to the content observer ever again, a button that specifies that the content observer wants to see the content displayed again right away, a button that specifies that the content observer wants to see all related content) or a response to display of particular targeted content. Or, a speech recognition system could be used to enable the content observer to verbalize preferences or a response (which could be limited to a relatively small set of specific commands) which are then used to control the content display or display particular targeted content. "Integration of speaker and speech recognition systems," by D. A. Reynolds et al., International Conference on Acoustics, Speech and Signal Processing, vol. 2, 1991, pp. 869-72, the disclosure of which is incorporated by reference herein, describes techniques which can be used in implementing such a speech recognition system. Or, a visual recognition system (e.g., video camera) could be used to discern a content observer's response to the display of particular targeted content based on visual recognition of viewer motion or appearance (e.g., did the content observer turn his face so that he was not looking at the content display device). The content observer's response can be used to effect particular control of the content display (e.g., if the content observer looked away during the display of a set of targeted content, decrease the likelihood of displaying that set of targeted content to that content observer again). FIG. 7 is a block diagram of a system, according to yet another embodiment of the invention, for use at a television viewing location for displaying targeted content on the television 205 at the television viewing location, in which a television viewer input apparatus 701 (e.g., tactile interface mechanism(s), speech recognition system, visual recognition system) enables a television viewer to interact with the television 205 and/or other components of the system (via the system controller 201).

Figure 8:
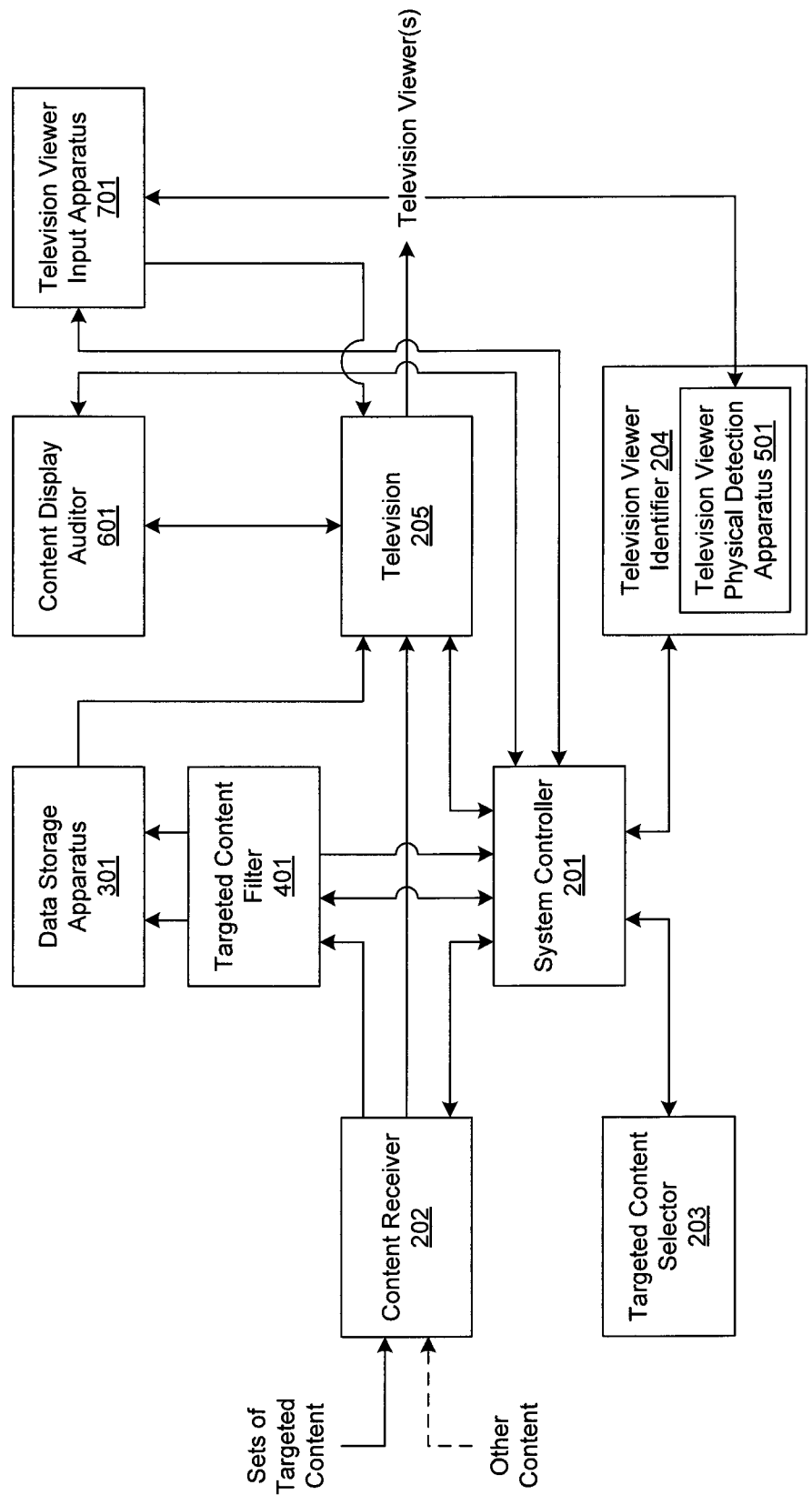
FIG. 8 is a block diagram of a system, according to still another embodiment of the invention, for use at a television viewing location for displaying targeted content on a television at the television viewing location.

FIG. 8 is a block diagram of a system, according to still another embodiment of the invention, for use at a television viewing location for displaying targeted content on the television 205 at the television viewing location, which includes each of the additional components (i.e., data storage device 301, targeted content filter 401, television viewer physical detection apparatus 501, content display monitor 601 and television viewer input apparatus 701) shown separately as part of systems according to the invention in FIGS. 3 through 7.

Generally, the invention can be used to display any type of targeted content. For example, the invention can be used to display targeted advertisements during commercial breaks during television programs. Or, for example, the invention can be used to display targeted content (e.g., targeted product placements) within a television program. The invention can be used to distribute targeted content over a computer network such as the Internet (and, in particular, the World Wide Web portion of the Internet). The invention can also be used to display targeted content for radio programs or real-time changeable billboard displays.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A system for displaying targeted content on a television at a television viewing location, comprising:
   means for receiving;
   a plurality of sets of primary content at the television viewing location, each of the plurality of sets of primary content having at least one targeted content display opportunity, and each of the plurality of sets of primary content comprising a subset of a category of content;
   a plurality of sets of targeted content at the television viewing location, each of the plurality of sets of targeted content adapted for display on the television during a targeted content display opportunity, individual sets of targeted content associated with at least one of a plurality of content providers, and each of the plurality of sets of targeted content specifying:
      (a) a demographic characteristic associated with a desired viewer of a set of targeted content, and
      (b) a value of the set of targeted content to individual content providers that varies in accordance with the demographic characteristic;
   means for ascertaining the identity and/or a characteristic of a television viewer watching the television at, or just prior to, the time of the targeted content display opportunity,
      wherein the identity and/or characteristic includes at least one of an age, a gender, an income, a facial characteristic, or a vocal characteristic, and
      wherein the means for ascertaining the identity and/or a characteristic of the television viewer include:
         means for monitoring the display of at least one set of primary content by the television;
         means for associating demographic probability information with the displayed at least one set of primary content; and
         means for determining a probable demographic of the television viewer, wherein the determination is based at least in part on the demographic probability information associated with the displayed at least one set of primary content; and
   means for processing instructions and/or data for selecting one of the received plurality of sets of targeted content for display to the television viewer during the targeted content display opportunity in accordance with a criterion based on:
      the identity and/or the characteristic of the television viewer,
      the demographic characteristic associated with the desired viewer of the set of targeted content, and
      the value of the set of targeted content.

2. The system of claim 1, wherein the means for ascertaining the identity and/or a characteristic of the television viewer comprises:
   means for monitoring the display of content by the television, wherein the means for monitoring the display of content by the television includes means for monitoring changes in the set of primary content being displayed by the television that are initiated by a television viewer;
   means for acquiring data-regarding a physical characteristic of a television viewer present in the vicinity of the television;
   means for processing the acquired data to produce data distinguishing each television viewer from each other television viewer;
   means for associating the primary content displayed by the television and/or the manner in which the primary content is displayed by the television with each television viewer who is present in the vicinity of the television at the time of such display; and means for determining the identity and/or a characteristic of a television viewer, wherein the determination of the identity and/or a characteristic of the television viewer is based at least in part, on the displayed primary content and/or the manner of display of content associated with that television viewer, and wherein the determination of the identity and/or a characteristic of the television viewer is based, at least in part, on changes in the set of primary content being displayed by the television that are initiated by a television viewer.

3. The system of claim 2, wherein one or more characteristics are associated with the set of primary content displayed by the television, wherein one or more characteristics are associated with each of a plurality of television viewers that may be present in the vicinity of the television, and wherein the determination of the identity and/or a characteristic of the television viewer is based, at least in part, on the one or more characteristics associated with one or more sets of displayed primary content associated with that television viewer and the one or more characteristics associated with the plurality of television viewers that may be present in the vicinity of the television.

4. The system of claim 1, wherein one or more characteristics are associated with each of a plurality of television viewers that may be present in the vicinity of the television; and wherein the means for ascertaining the identity and/or a characteristic of the television viewer further includes means for determining the identity and/or a characteristic of a television viewer who is present in the vicinity of the television at the time that one or more sets of primary content are displayed, the determination being based on the one or more characteristics associated with each of the plurality of television viewers, and the one or more displayed sets of primary content displayed and/or the manner in which the one or more sets of primary content are displayed by the television.

5. The system of claim 1, wherein the means for processing instructions and/or data for selecting one of a plurality of sets of targeted content for display is located at the television viewing location, and wherein the system further comprises:

a data storage device located at the television viewing location for storing the plurality of sets of targeted content; and means for processing instructions and/or data for selecting a second plurality of sets of targeted content from the first plurality of sets of targeted content, in accordance with a criterion related to the identity and/or a characteristic of the television viewer and/or the television viewing location, wherein the second plurality of sets of targeted content is a subset of the first plurality of sets of targeted content representing sets of targeted content that may possibly be selected for display to the television viewer by the means for processing instructions and/or data for selecting one of a plurality of sets of targeted content for display.

6. The system of claim 1, further comprising means for transmitting the sets of targeted content to the means for receiving from a location remote the television viewing location, wherein the means for transmitting further comprises means for broadcasting the sets of targeted content from the remote location, wherein the plurality of sets of targeted content comprise sets of secondary content that are displayed within the display of the set of primary content, between the displays of sets of primary content, or during breaks in the display of a set of primary content, wherein the means for broadcasting broadcasts the sets of primary content over one or more primary content channels, wherein the means for broadcasting continuously and repeatedly broadcasts the plurality of sets of secondary content over one or more secondary content channels, and wherein the means for receiving is adapted to receive the set of primary content if the set of primary content is available to be received and to receive sets of secondary content at times when the set of primary content is not being received.

7. The system of claim 1, wherein the instructions and/or data for selecting one of the plurality of sets of targeted content for display include: instructions and/or data regarding when a particular set of targeted content can or cannot be displayed, and wherein the instructions and/or data regarding when a particular set of targeted content can or cannot be displayed include instructions and/or data regarding the frequency with which a particular set of targeted content can or cannot be displayed at a particular television viewing location and/or to a particular television viewer.

8. The system of claim 1, wherein the instructions and/or data for selecting one of the plurality of sets of targeted content for display include instructions and/or data regarding when a particular set of targeted content can or cannot be displayed, and wherein the instructions and/or data regarding when a particular set of targeted content can or cannot be displayed include instructions and/or data regarding the temporal proximity of display of a particular set of targeted content to the display of other content, to another display of the same set of targeted content, to the display of content of a particular type, or to the display of another particular set of targeted content.

9. The system of claim 1, wherein a first television program displayed on a first television channel is displayed simultaneously with a second television program displayed on a second television channel such that a first break in the first television program at least partially overlaps a second break in the second television program, the system further comprising means for continuing to display, during the second break, a set of targeted content being displayed during the first break.

10. The system of claim 1, further comprising means for enabling a viewer to indicate a response to display of a particular set of targeted content, wherein the means for enabling a viewer to indicate a response to display of a particular set of targeted content further comprises for means for enabling a viewer to indicate a level of satisfaction with the display of a particular set of targeted content.

11. The system of claim 1, further comprising means for discerning a viewer's response to display of a particular set of targeted content, and wherein compensation from a content provider fort display of a particular set of targeted content provided by the content provider is dependent on the discerned viewer response to display of the particular set of targeted content.

12. A method for displaying a set of targeted content within a display of a set of primary content on a display device at a viewing location, comprising:

automatically monitoring a display of content by the display device at the viewing location, including tracking changes over time in a set of content being displayed by the display device, wherein the changes are initiated by a viewer;

automatically ascertaining the identities and/or characteristics of multiple viewers viewing the display device at the viewing location at, or just prior to, the time of a targeted content display opportunity,
- wherein the identities and/or characteristics include at least one of an age, a gender, an income, a facial characteristic, or a vocal characteristic, and
- wherein automatically ascertaining the identities or characteristics includes:
  - passively acquiring data regarding physical characteristics of the viewers without requiring affirmative action from the viewers,
  - processing the passively acquired data to distinguish each viewer from each other viewer at the viewing location, and
  - associating the content displayed, by the display device and/or a manner in, which the content is displayed by the display device with each of the viewers at the viewing location;

processing instructions and/or data for selecting one of multiple sets of targeted content for display to the viewers during the targeted content display opportunity, individual sets of targeted content associated with at least one of a plurality of content providers, each of the multiple set of targeted content specifying:
- (a) a demographic characteristic associated with a desired viewer of a set of targeted content, and
- (b) a value of the set of targeted content to individual content providers that varies in accordance with the demographic characteristic, wherein the one of the multiple sets of targeted content is selected in accordance with:
- a criterion based on the identities and/or the characteristics of the viewers;
- a criterion based on the demographic characteristic associated with the desired viewer;
- a criterion based on the value of the set of targeted content; and
- a criterion based on the changes in the set of content being displayed by the display device that are initiated by a viewer;

allowing the viewers to actively select from among the multiple sets of targeted content;
receiving the set of primary content at the viewing location;
receiving the set of targeted content at the viewing location; and
integrating the selected set of targeted content into the set of primary content.

13. The method of claim 12, wherein one or more characteristics are associated with a set of targeted content displayed by the display device, and
wherein the determination of the identities and/or characteristics of the viewers is based, at least in part, on the one or more characteristics associated with one or more sets of displayed targeted content associated with the viewers.

14. The method of claim 13, further comprising processing instructions and/or data for selecting a second set of targeted content from a first of the multiple sets of targeted content, in accordance with a criterion related to the identities and/or characteristics of the viewers and/or the viewing location, wherein the second set of targeted content is a subset of the first set of targeted content.

15. The method of claim 12, wherein the instructions and/or data for selecting one of the multiple sets of targeted content for display include instructions and/or data indicating a value placed on a particular set of targeted content by the content provider that provides that set of targeted content, and wherein the value varies in accordance with the identities and/or characteristics of the viewers.

16. The method of claim 12, wherein the set of targeted content is a product placement.

17. The method of claim 12, wherein compensation from a content provider for display of a particular set of targeted content provided by the content provider is dependent on at least one of the discerned viewers' responses to display of the particular set of targeted content.

18. The method of claim 12, wherein integrating the selected set of targeted content into the set of primary content further comprises:
- identifying the location within the set of primary content at which the selected set of target content is to be displayed;
- modeling the reflected light at the identified location
- determining the manner in which content proximate to the identified location modifies the light reflected at the identified location; and
- using the modeled reflected light and the modification of the reflected light by the proximate content to produce a display of the selected set of targeted content at the identified location within the set of primary content.

19. The method of claim 18, wherein the modeling of the reflected light at the identified location and the determination of the manner in which content proximate to the identified location modifies the light reflected at the identified location is performed once and used to produce display of any set of targeted content at the identified location within the set of primary content.

20. The system of claim 1, wherein the means for ascertaining the identity and/or a characteristic: of a television viewer includes determining whether the viewer is a parent or a child, and wherein a determination that the viewer is a parent corresponds to greater value for the set of targeted content than a determination that the viewer is a child.

21. A system for displaying targeted content on a television at a television viewing location, comprising:
- at least one data storage device;
- at least one processor coupled to the data storage device, wherein the processor is configured to
- receive a plurality of sets of primary content at the television viewing location, each of the plurality of sets of primary content having at least one targeted content display opportunity, and each of the plurality of sets of primary content comprising a subset of a category of content;
- receive a plurality of sets of targeted content at the television viewing location, each of the plurality of sets of targeted content adapted for display on the television during a targeted content display opportunity, individual sets of targeted content associated with at least one of a plurality of content providers, and each of the plurality of sets of targeted content specifying:
  - (a) a demographic characteristic associated with a desired viewer of a set of targeted content, and
  - (b) a value of the set of targeted contend to individual content providers that varies in accordance with the demographic characteristic;
- ascertain the identity and/or a characteristic of a television viewer watching the television at, or just prior to, the time of the targeted content display opportunity, wherein the identity and/or characteristic includes at least one of an age, a gender, an income, a facial characteristic, or a vocal characteristic, and wherein ascertaining the identity and/or a characteristic of the television viewer includes:
monitoring the display of at least one set of primary content by the television;
associating demographic probability information with the displayed at least one set of primary content; and
determining a probable demographic of the television viewer, wherein the determination is based at least in part on the demographic probability information associated with the displayed at least one set of primary content; and process instructions and/or data to select one of the received plurality of sets of targeted content for display to the television viewer during the targeted content display opportunity in accordance with a criterion based on:
the identity and/or the characteristic of the television viewer,
the demographic characteristic associated with the desired viewer of the set of targeted content, and
the value of the set of targeted contend.

22. The system of claim 21, wherein ascertaining the identity and/or a characteristic of the television viewer comprises:
monitoring the display of content by the television, wherein monitoring the display of content by the television includes monitoring changes in the set of primary content being displayed by the television that are initiated by a television viewer;
acquiring data regarding a physical characteristic of a television viewer present in the vicinity of the television;
processing the acquired data to produce data distinguishing each television viewer from each other television viewer;
associating the primary content displayed by the television and/or the manner in which the primary content is displayed by the television with each television viewer who is present in the vicinity of the television at the time of such display; and
determining the identity and/or a characteristic of a television viewer, wherein the determination of the identity and/or a characteristic of the television viewer is based, at least in part, on the displayed primary content and/or the manner of display of content associated with that television viewer, and wherein the determination of the identity and/or a characteristic of the television viewer is based, at least in part, on changes in the set of primary content being displayed by the television that are initiated by a television viewer.

23. The system of claim 21, wherein the processor is further configured to receive a response from a viewer to a display of a particular set of targeted content, and wherein receiving a response from a viewer includes receiving an indication from a viewer of a level of satisfaction with the display of a particular set of targeted content.

24. The system of claim 21, wherein the processor is further configured to discern a viewer response to display of a particular set of targeted content, and wherein compensation from a content provider fort display of a particular set of targeted content provided by the content provider is dependent on the discerned viewer response to display of the particular set of targeted content.

* * * * *

UNITED STATES PATENT AND TRADEMARK OFFICE
CERTIFICATE OF CORRECTION

PATENT NO.        : 8,910,199 B2  
APPLICATION NO.   : 12/400667  
DATED             : December 9, 2014  
INVENTOR(S)       : Malcolm Slaney et al.

It is certified that error appears in the above-identified patent and that said Letters Patent is hereby corrected as shown below:

Title Page, item (56),

On page 3, in column 2, under "Other Publications", line 11, delete "'Inidvidualized" and insert -- 'Individualized --, therefor.

On page 3, in column 2, under "Other Publications", line 12, delete "Pres;s" and insert -- Press --, therefor.

On page 3, in column 2, under "Other Publications", line 36, delete "Internatioanale" and insert -- Internationale --, therefor.

In the Specification

In column 20, line 36, delete "09/724/789" and insert -- 09/724,789 --, therefor.

In column 22, line 33, delete "that that" and insert -- that --, therefor.

In the Claims

In column 24, line 4, in claim 1, delete "receiving;" and insert -- receiving: --, therefor.

In column 24, line 59, in claim 2, delete "data-regarding" and insert -- data regarding --, therefor.

In column 25, line 6, in claim 2, delete "based" and insert -- based, --, therefor.

In column 25, line 63, in claim 6, delete "the" and insert -- from the --, therefor.

In column 26, line 21, in claim 7, delete "include:" and insert -- include --, therefor.

In column 26, line 53, in claim 10, delete "for means" and insert -- means --, therefor.

In column 26, line 59, in claim 11, delete "fort" and insert -- for --, therefor.

In column 27, line 20, in claim 12, delete "displayed," and insert -- displayed --, therefor.

In column 27, line 21, in claim 12, delete "in," and insert -- in --, therefor.

In column 27, line 29, in claim 12, delete "set" and insert -- sets --, therefor.

Signed and Sealed this  
Seventh Day of April, 2015

Michelle K. Lee  
*Director of the United States Patent and Trademark Office*

CERTIFICATE OF CORRECTION (continued)
U.S. Pat. No. 8,910,199 B2

In column 28, line 21, in claim 18, delete "location" and insert -- location; --, therefor.

In column 28, line 37, in claim 20, delete "characteristic:" and insert -- characteristic --, therefor.

In column 28, line 40, in claim 20, delete "to" and insert -- to a --, therefor.

In column 28, line 46, in claim 21, delete "to" and insert -- to- --, therefor.

In column 28, line 62, in claim 21, delete "contend" and insert -- content --, therefor.

In column 29, line 25, in claim 21, delete "contend." and insert -- content. --, therefor.

In column 30, line 27, in claim 24, delete "viewer" and insert -- viewer's --, therefor.

In column 30, line 30, in claim 24, delete "fort" and insert -- for --, therefor.